United States Patent
Levin et al.

(10) Patent No.: US 8,935,365 B1
(45) Date of Patent: Jan. 13, 2015

(54) GROUP POLICY FRAMEWORK

(75) Inventors: Joseph Levin, Arlington, MA (US); Danny Kim, San Jose, CA (US)

(73) Assignee: Full Armor Corporation, Boston, MA (US)

( * ) Notice: Subject to any disclaimer, the term of this patent is extended or adjusted under 35 U.S.C. 154(b) by 606 days.

(21) Appl. No.: 12/381,671

(22) Filed: Mar. 13, 2009

Related U.S. Application Data

(60) Provisional application No. 61/069,605, filed on Mar. 14, 2008.

(51) Int. Cl.
*G06F 15/16* (2006.01)

(52) U.S. Cl.
USPC .......................................... 709/220; 709/223

(58) Field of Classification Search
USPC .................................. 709/220, 223
See application file for complete search history.

(56) References Cited

U.S. PATENT DOCUMENTS

| | | | |
|---|---|---|---|
| 6,389,589 B1 * | 5/2002 | Mishra et al. ................. | 717/170 |
| 6,466,932 B1 * | 10/2002 | Dennis et al. .................. | 710/33 |
| 6,836,794 B1 * | 12/2004 | Lucovsky et al. ............. | 709/223 |
| 7,631,061 B2 * | 12/2009 | Lucovsky et al. ............. | 709/223 |
| 8,078,713 B1 * | 12/2011 | Kim ............................... | 709/223 |
| 8,117,230 B2 * | 2/2012 | Shaji et al. ..................... | 707/786 |
| 8,244,841 B2 * | 8/2012 | Shaji et al. ..................... | 709/223 |
| 8,788,632 B2 * | 7/2014 | Taylor et al. .................. | 709/220 |
| 2004/0215650 A1 * | 10/2004 | Shaji et al. ..................... | 707/102 |
| 2006/0174320 A1 | 8/2006 | Maru et al. | |
| 2007/0061889 A1 | 3/2007 | Sainaney | |
| 2008/0082480 A1 | 4/2008 | Gounares et al. | |
| 2008/0082601 A1 | 4/2008 | Meijar et al. | |
| 2008/0091613 A1 | 4/2008 | Gates et al. | |

\* cited by examiner

*Primary Examiner* — Douglas Blair
(74) *Attorney, Agent, or Firm* — Hamilton, Brook, Smith & Reynolds, P.C.

(57) ABSTRACT

In an embodiment, a method includes configuring policy settings, storing the configured policy settings in a common document format and consuming the common document format to implement the configured policy settings. Policy settings are stored in a settings document having a common document format that defines how to implement policy operations on the policy settings, the policy operations including configuration, application, analysis, reporting and auditing. The settings document is processed to implement any of the policy operations.

19 Claims, 26 Drawing Sheets

SCHEMA ELEMENTS
1802

SETTING INSTANCES
1804

FIG. 18

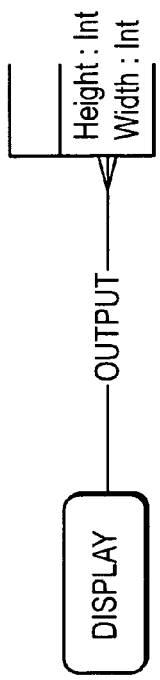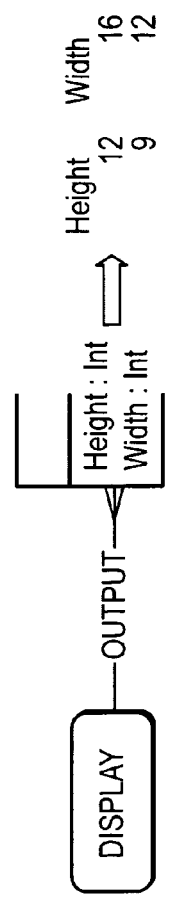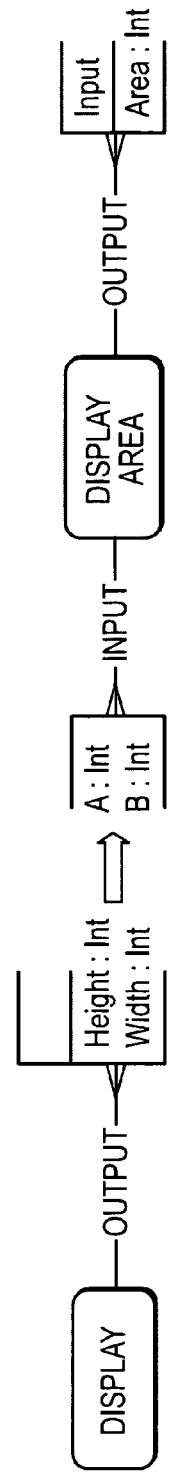

LARGE DISPLAYS ATTRIBUTE HAS AN AREA PROPERTY, WHICH IT USES TO EXCLUDE CERTAIN VALUES

| GROUP 1 | | PRECEDENCE |
|---|---|---|
| → CLIENT SETTING A1 | | 1 |
| → CLIENT SETTING B1 | | 2 |
| → CLIENT SETTING C1 | | 3 |
| → CLIENT SETTING D1 | | 4 |
| → GROUP 2 | | |
| | → CLIENT SETTING C2 | 5 |
| | → CLIENT SETTING D2 | 6 |
| → GROUP 3 | | |
| | → CLIENT SETTING C3 | 7 |
| | → CLIENT SETTING D3 | 8 |
| | → CLIENT SETTING E1 | 9 |

GROUP POLICY FRAMEWORK

RELATED APPLICATION

This application claims the benefit of U.S. Provisional Application No. 61/069,605, filed on Mar. 14, 2008, the entire teachings of which are incorporated herein by reference.

BACKGROUND

Group policy is a concept that enables various user and computer settings to be defined and managed centrally on a network. In the Microsoft Windows environment, "Group Policy" and "Active Directory" services infrastructure enable information technology (IT) administrators to automate one-to-many management of users and computers—simplifying administrative tasks and reducing management costs.

Group policy has many advantages including centralizing computer system settings for various computer systems at a domain, site and/or organizational unit (OU) level in order to enforce uniformity across the computer systems; allowing the application of different policies to different sites, domains and OUs in order to manage, e.g., different sets of users; enabling user desktop environments to be managed in order to reduce, e.g., time spent troubleshooting configuration problems; enabling the installation, update, repair and removal of software on various computer systems to be centrally managed; and enabling the creation and management of account policies, configuration policies, audit policies and other security features in order to manage the security of computers and users in, e.g., a domain.

Group policy objects (GPOs) are often employed to implement certain policies on a computer system. A GPO is a structure that contains a collection of computer settings associated with a group policy. For example, a GPO may contain settings that determine access rights and privileges for a particular user when the user logs into a computer system. GPOs may be configured to perform various management tasks on a computer system, such as distributing registry settings, distributing security settings and/or deploying software. Further, GPOs may be configured to implement other policy related functions, such as establishing roaming user profiles and redirecting file system folders to, e.g., a network share file system. In a typical arrangement, a system administrator creates a GPO and targets it to a particular site, domain and/or organizational unit. The GPO is delivered to the appropriate computer systems which are then configured according to the contents of the GPO.

GPOs are stored on the domain controllers or on the client machines; GPOs stored on client machines are called local GPOs or LGPOs. Policy settings are acquired from both the GPOs on the domain controller (DC) and from the local GPOs and applied to the system.

A GPO may be organized into various types of policies including, for example, administrative templates, folder redirection, security settings, and software installation. Each policy type may, in turn, be configured to support a number of policy settings. For example, a GPO may contain administrative template settings that both hide icons on a user's desktop and prevent the user from running certain applications.

Policy settings are applied to a computer system when the system is started, a user logs into the system, a user logs out of the system or when the system is shut down. Additionally the settings for the system and user may be refreshed at regular intervals. For DCs, the policy settings are typically refreshed every five minutes. For client computers, the policy settings are typically refreshed every ninety minutes plus a random offset of up to thirty minutes. In addition, certain policy settings, such as policy settings associated with software installation and folder redirection, may be applied only when the system starts up or when a user logs into the system, and are not refreshed periodically.

SUMMARY

Embodiments of a Group Policy framework capability disclosed herein define an object model for the configuration, application and management of group policies for a computer environment. Policies are specified in a settings document in a common document format.

Accordingly, a method includes configuring policy settings, storing the configured policy settings in a common document format and consuming the common document format to implement the configured policy settings. Implementing the configured policy may include managing the policy settings, performing planning operations based on the policy settings, applying the policy settings and migrating the policy settings.

In another aspect, a method comprises storing policy settings in a settings document having a common document format that defines how to implement policy operations on the policy settings, the policy operations including configuration, application, analysis, reporting and auditing. The settings document is processed to implement any of the policy operations.

The policy configuration operation may include loading a schema document that defines configurable policy settings, selecting from the schema document a setting type to configure, creating an instance of the selected setting type in the settings document and setting a user parameter value to customize the setting instance.

The policy application operation may include loading plural settings documents, each settings document including policy settings, merging the policy settings from the plural settings documents based on a priority to generate a resultant set of policy (RSoP) document, applying the merged policy settings from the RSoP document to a client and storing the RSoP document as an RSoP logging document.

The policy auditing operation may include selecting a computer on which to report, loading an RSoP logging document from the selected computer and generating a report based on the RSoP logging document.

The policy analysis operation may include loading plural settings documents, each settings document including policy settings, merging the policy settings from the plural settings documents based on a priority to generate a resultant set of policy (RSoP) document, storing the RSoP document as an RSoP planning document and generating a report based on the RSoP planning document.

The policy reporting operation may include loading the settings document and generating a report based on the settings document.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 18 illustrates an example structure for a settings document.

FIGS. 20-33 illustrate aspects of an embodiment of the Group Policy framework.

DETAILED DESCRIPTION

Figure 1:
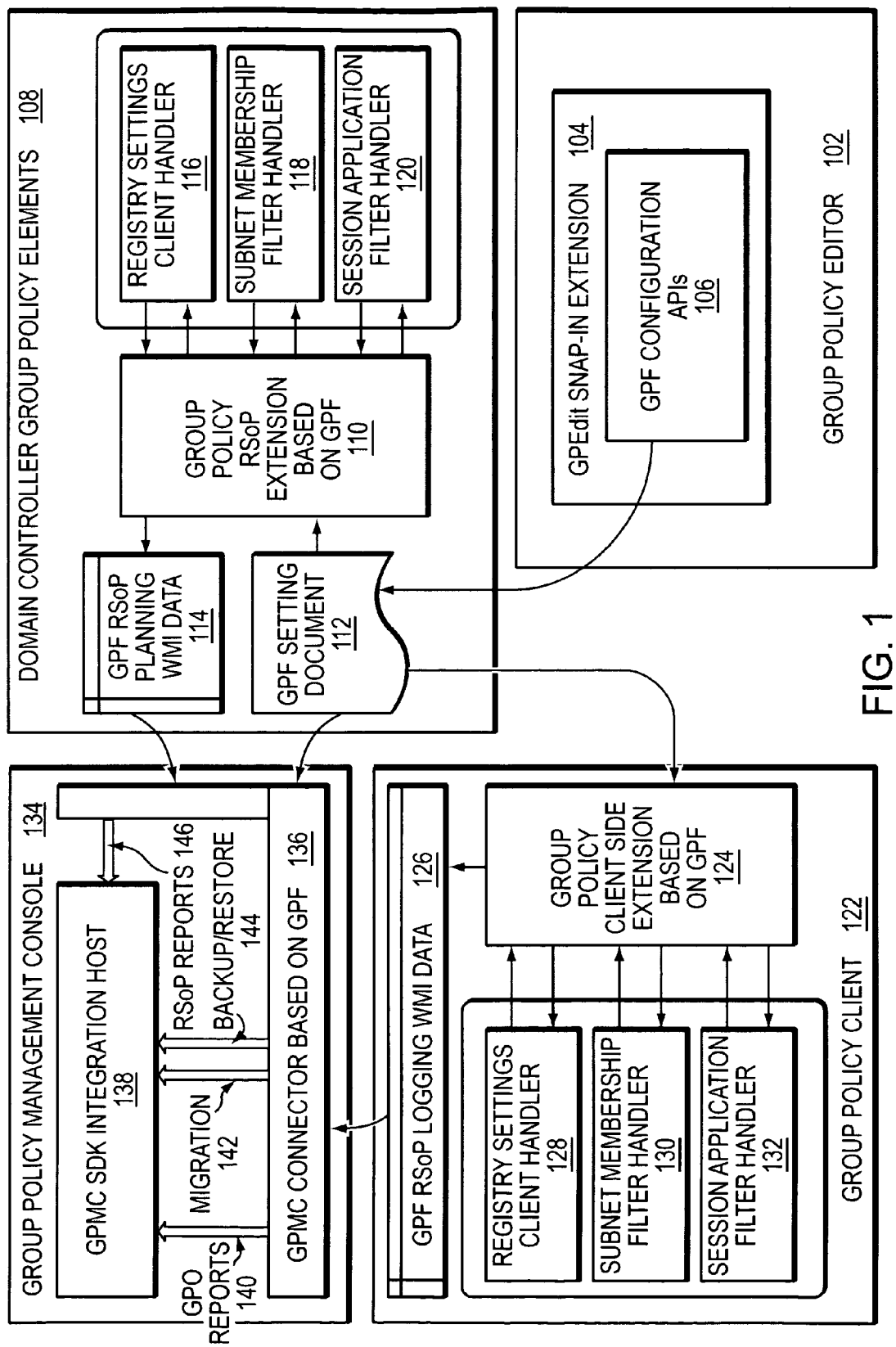
FIG. 1 illustrates an embodiment of a Group Policy framework configuration in accordance with principles of the present invention.

A description of example embodiments of the invention follows.

In the description that follows, the term "Group Policy Framework (GPF)" refers to a capability that allows a system administrator to add and extend policy settings implemented with the Microsoft (MS) Group Policy infrastructure. It should be noted that other operating systems and policy infrastructures may be adapted to be used with the principles of the present disclosure including e.g., Unix, and Linux. In addition, the principles of the present disclosure can be applied to other application environments including those that operate in conjunction with such vendors as VMWare and Citrix.

The MS Group Policy and Active Directory services infrastructure in MS Windows Server is designed to enable system administrators to implement security settings, enforce IT policies, and distribute software consistently across a given site, domain or range of organizational units.

The MS Group Policy infrastructure is extensible and also disjointed. It is extensible in that it supports storage of data in any format desired, and it enforces almost no restrictions on how the policy is applied. It is disjointed in the sense that the implementation of policy configuration, application, analysis and reporting are each independent, although logically these policies are all closely related. Because the Group Policy infrastructure is structured in this way, developers have had to do basic work to configure and apply settings, additional work to support rollback of settings, further work to support reporting of settings, and yet more work to support Resultant Set of Policy (RSoP) analysis. Because of such requirements, many MS Group Policy implementations have limitations that are undesirable.

To address these limitations, embodiments of the GPF capability disclosed herein provide a set of libraries that incorporate the logical relationships among the various policy operations, thus allowing developers to implement the logic related to a particular setting just once—completely and correctly—and share the implementation among operations that require that setting.

The MS Group Policy infrastructure has the following major components:

Group Policy Editor (GPEdit) snap-in: Used to edit settings. The GPEdit snap-in can run on any machine within the domain and remotely edit the domain's MS Group Policy Objects (GPOs).

Domain Controller Group Policy Elements: Generate RSoP planning mode by means of the Group Policy RSoP extension, which resides on the domain controllers. The Group Policy RSoP extension is responsible for a what-if analysis calculation to determine which policy settings a given user or computer will receive.

Group Policy client and extensions: Implements application of group policy, by means of Group Policy client extensions that are installed and executed on each of the managed endpoints. In addition to applying settings, the Group Policy client extensions are responsible for generating RSoP logging mode data. The RSoP logging data is a record of what settings the client applied, along with associated error information.

Group Policy Management Console (GPMC) snap-in: Handles general management of GPOs, such as reporting and backup. The GPMC snap-in can be installed on any computer in the domain.

Any extension to MS Group Policy that incorporates entirely new settings generally needs to integrate with all four of these components. The GPF capability disclosed herein facilitates this integration.

FIG. 1 illustrates the MS Group Policy components with the GPF capability integrated therein. The MS Group Policy components include Group Policy Editor (GPEdit) 102, Domain Controller Group Policy elements 108, Group Policy client 122 and Group Policy Management Console 134.

The Group Policy Editor 102 includes GPEdit snap-in extension 104 which is modified to include GPF Configuration APIs 106 that provide COM objects for configuring policy settings. A GPEdit extension can use the APIs to modify the policy settings within a GPO.

The Domain Controller Group Policy elements 108 store the policy settings within the GPOs in a document called a GPF settings document 112 which is described further herein. Group Policy RSoP extensions based on GPF 110 operate together with handlers for registry settings 116, subnet membership filtering 118 and session application filtering 120 to derive a GPF RSoP planning data store 114 from the GPF settings document 112. The RSoP planning data store 114 uses a WMI data format.

The Group Policy client 122 includes Group Policy client side RSoP extensions based on GPF 124 and handlers for registry settings 128, subnet membership filtering 130 and session application filtering 132. The Group Policy RSoP extensions 124 and the handlers 128, 130, 132 are the same as the RSoP extensions 110 and handlers 116, 118, 120, respectively, for the Domain Controller Group Policy elements 108. The Group Policy client machines support a GPF RSoP logging data store 126 derived from the GPF settings document 112 that uses the same WMI format.

The GPMC 134 supports a GPMC connector based on GPF 136 and a software development kit (SDK) integration host 138. The GPMC connector 136 is a GPF component derived from the GPMC SDK 138 which supports the following services: GPO reports 140, migration 142, backup and restore 144 and RSoP reports 146.

Figure 2:
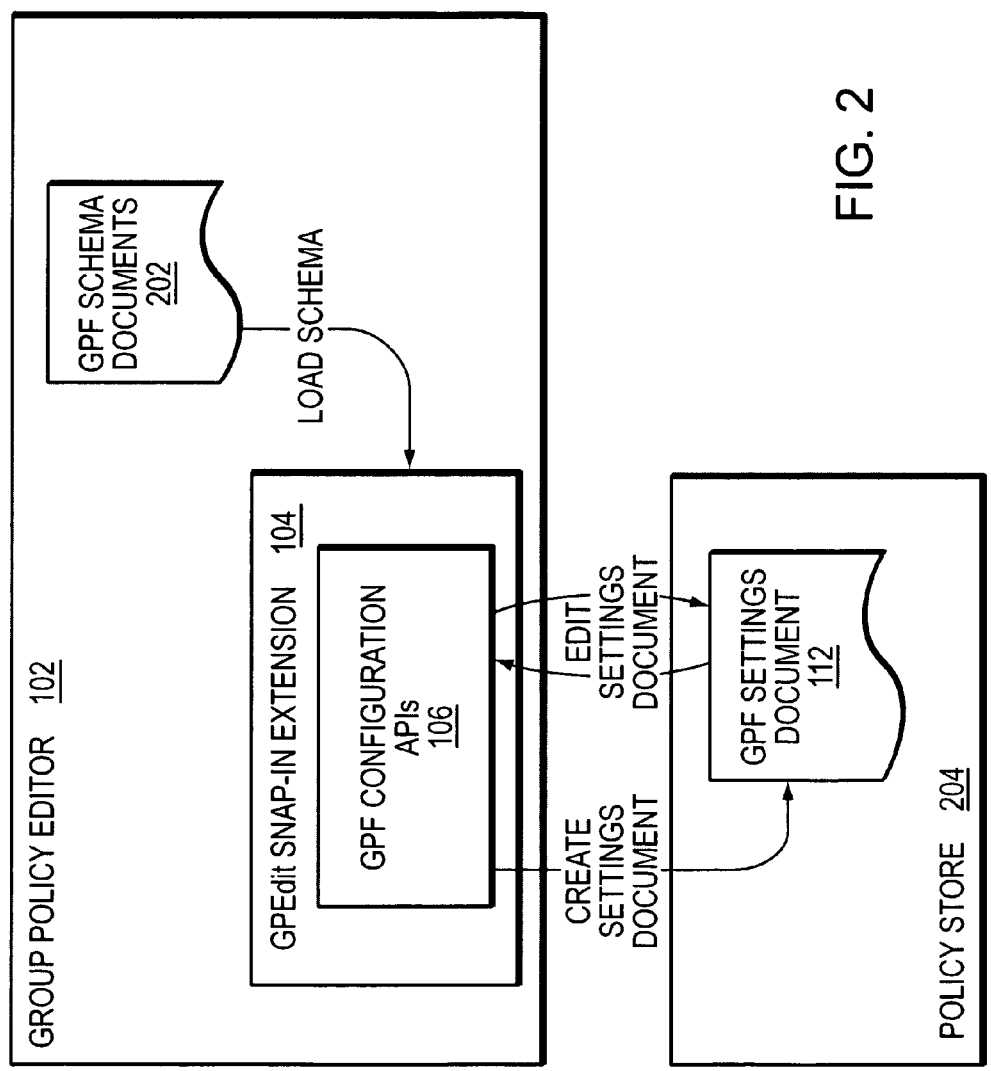
FIG. 2 illustrates a configuration operation.

Referring now to FIG. 2, an overview of the configuration operation is shown. GPF schema documents 202 are stored "locally" where the editing application at an administrator configuration console can load them. The schema documents 202 define the settings that can be configured. The editing application (e.g., GPEdit 104) creates the initial version of a GPF settings document 112 in a policy store 204, the contents of which are based on data from the schema documents 202. Updates to the settings document 112 are done by reading from an existing document and writing modifications back. These modification can include additional data from schema documents 202.

Figure 3:
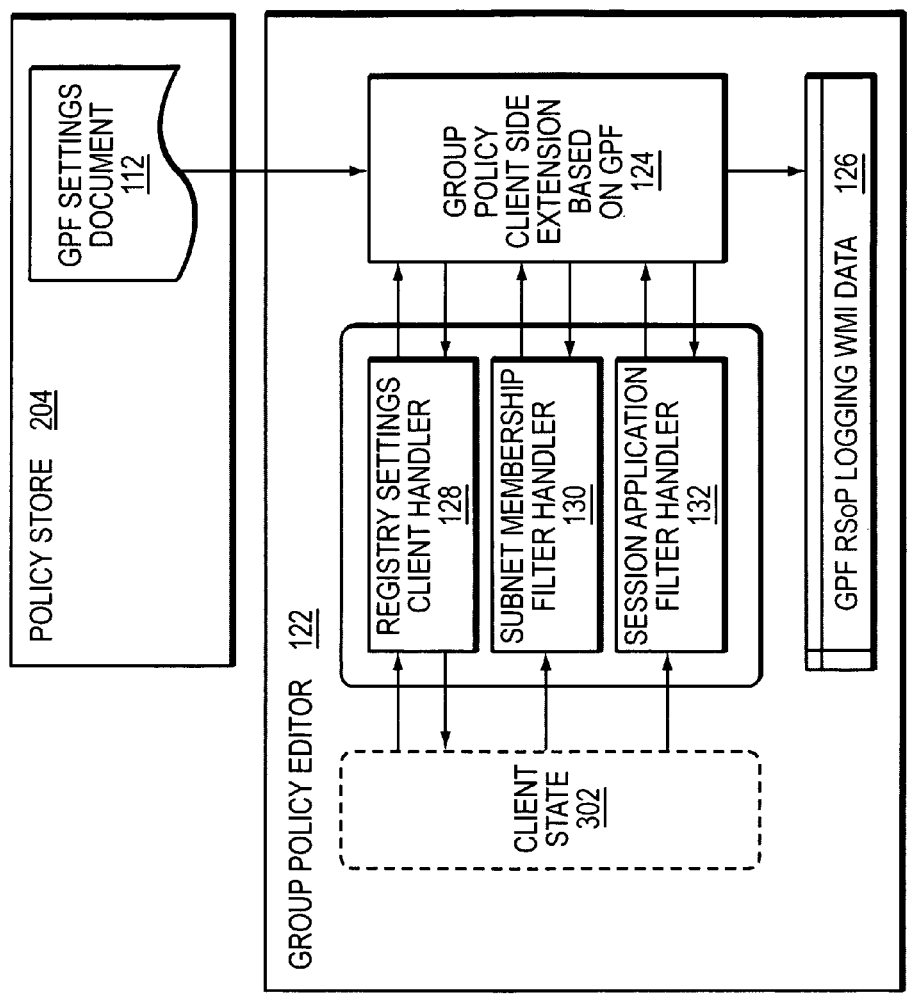
FIG. 3 illustrates an application operation.

FIG. 3 illustrates an overview of the application operation. The GPF settings document 112 from policy store 204 is accessed at the Group Policy client 122 to derive the GPF RSoP logging WMI data store 126 using Group Policy client side extension based on GPF 124. A client state 302 is referenced through the registry settings client handler 128, subnet membership filter handler 130 and session application filter handler 132.

Figure 4:
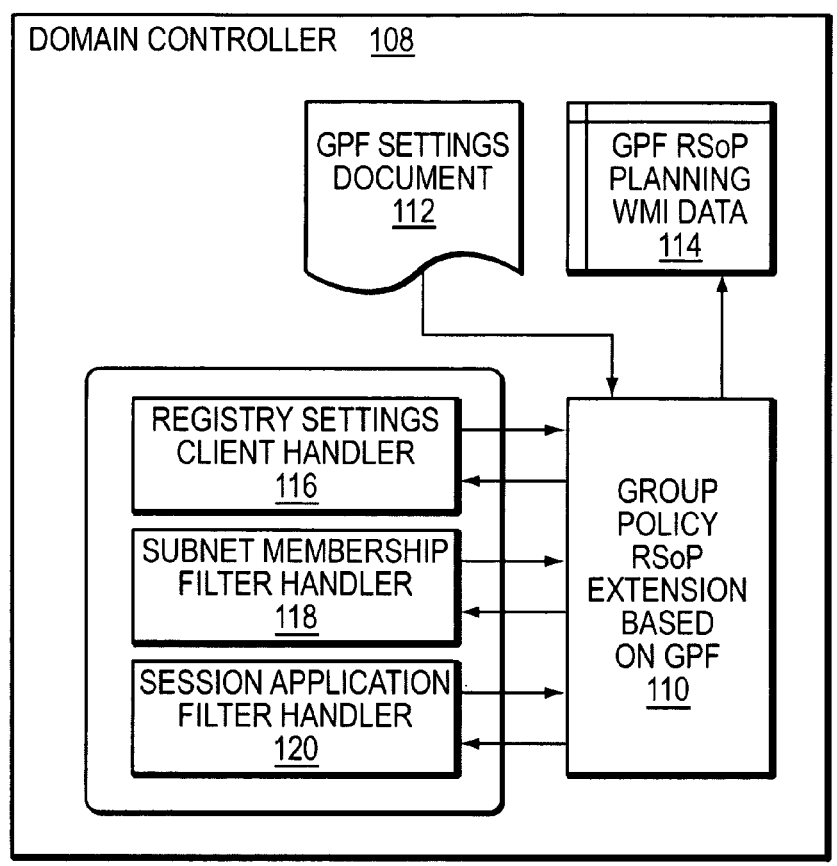
FIG. 4 illustrates a planning operation.

Referring now to FIG. 4, an overview of a planning operation is shown. The GPF settings document 112 is accessed at the Domain Controller 108 to derive the GPF RSoP planning WMI data store 114 using Group Policy RSoP extension based on GPF 110 and using the registry settings client handler 116, subnet membership filter handler 118 and session application filter handler 120.

Figure 5:
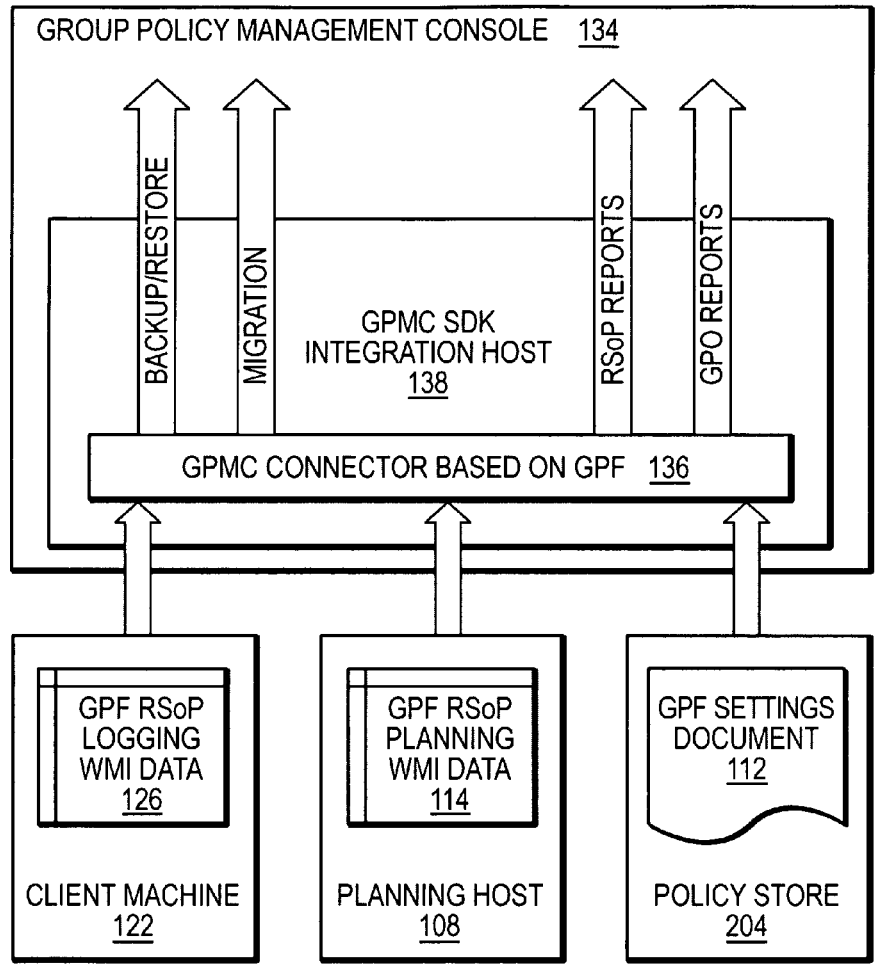
FIG. 5 illustrates a management operation.

FIG. 5 illustrates an overview of management operations. The GPF settings document 112 from policy store 204, GPF RSoP logging WMI data 126 and GPF RSoP planning WMI data 114 are accessed at the Group Policy Management Console 134 to provide backup/restore, migration, RSoP reports and GPO reports using GPMC SDK integration host 138.

Figure 6:
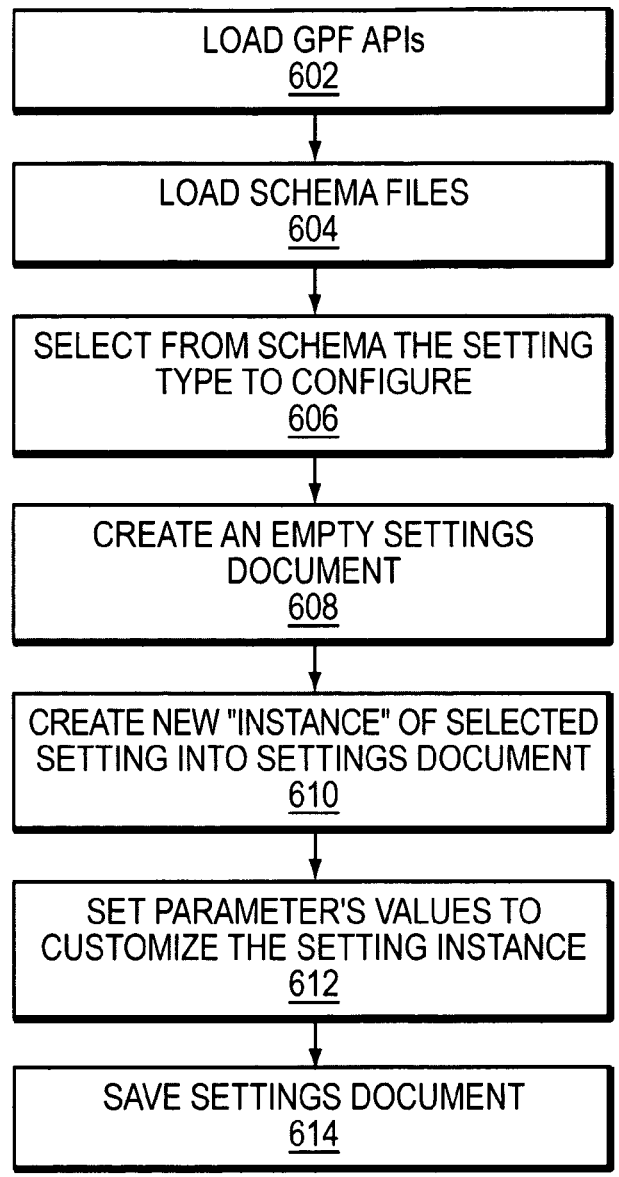
FIGS. 6-17 illustrate flow diagrams in relation to operations in the environment of the configuration of FIG. 1.

Referring now to FIG. 6, a flow diagram is shown that illustrates the creation of a new settings documents. At 602, GPF APIs are loaded. The GPF APIs define an object model for working with the GPF Documents. The term "load the GPF APIs" is short hand for starting to work with the GPF environment. At 604, the schema files are loaded. The schema files contain the definitions of client setting types. Each client setting type contains information about and how to apply, merge, report on and to migrate the client setting instances that implement the client setting type. In order to create a client setting instance the corresponding client setting type's schema is required.

At 606, a selection is made from the schema of the client setting type to configure, i.e., choosing what to configure. At 608, an empty document is created. Since a new settings document is being created, we start out with an "empty" document. The document format may contain internal structure that is provided even for documents that do not contain any client setting instances.

At 608, a new "instance" of the selected client setting type is created and added to the settings document. Each client setting instance has a basic structure that includes a unique ID for the client setting instance, the associated client setting type in the schema and the options available to the user to customize the client setting instance, referred to herein as parameters. Client setting instances are added into the document in a prioritized order that is used to resolve conflict between the different client setting instances when they apply. Note that, since the client setting type in the schema defines how to process a client setting instance (to apply it, to report on it, to copy it, etc.), having access to the schema is usually required when working with a client setting instance. To ensure that the schema is always available a copy (or the needed subset) of the schema can be added to the settings document.

At 610, the parameter's values to customize the client setting instance are set. The parameter values are used when processing the client setting instance. What parameters are available is defined by the client setting type which references them in defining how the client setting instances are processed. The values assigned by the instances become input parameters to the client setting types definition of how to process them. For example, a client setting type may allow a user to configure the screen saver options. The user parameters for an instance of that client setting type would then specify which screensaver to use and when to activate it.

Additional client setting instances can be added to the document as needed by repeating steps 606-612. At 614, the settings document is saved with the new settings.

Figure 7:
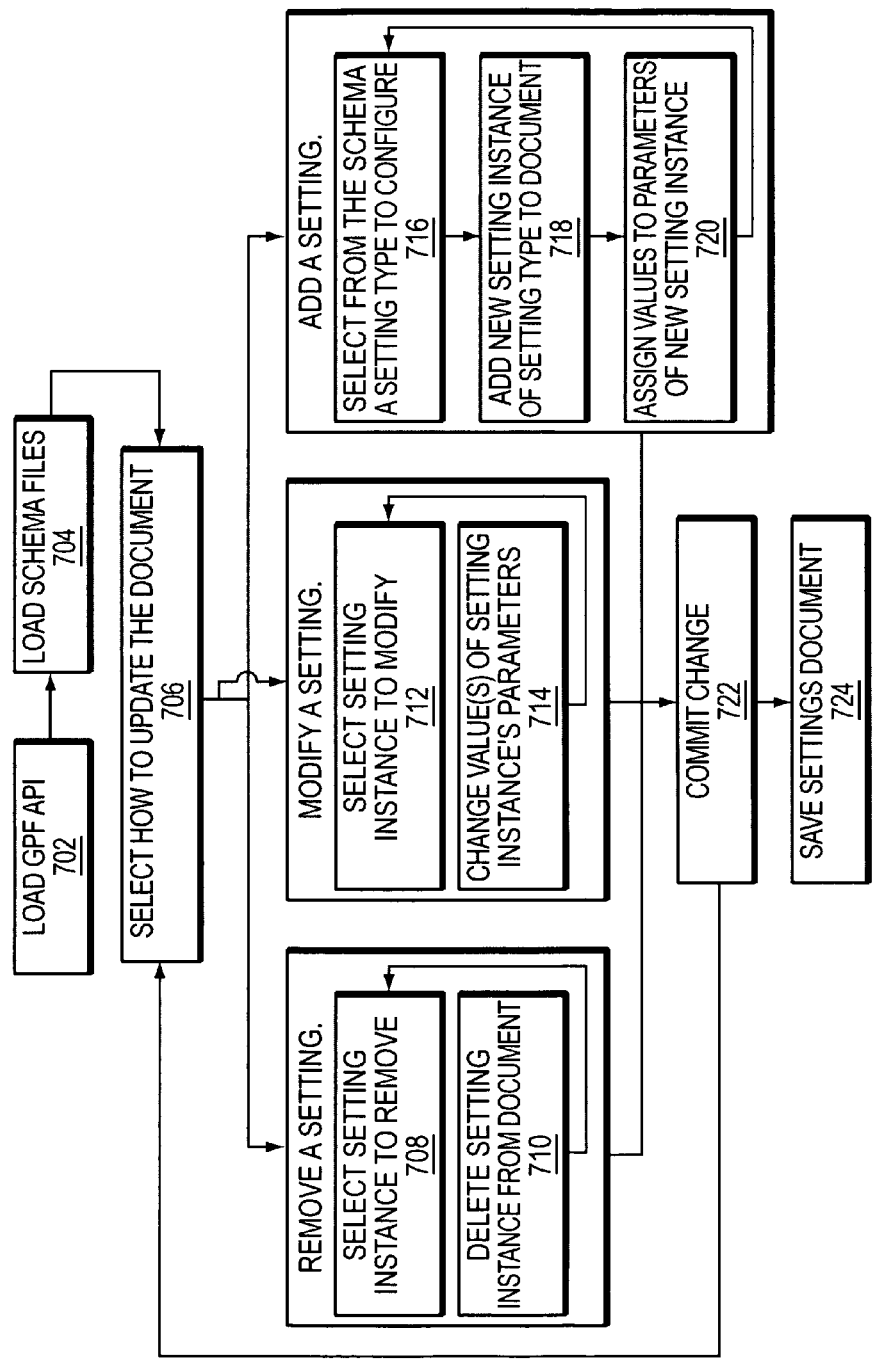

FIG. 7 illustrates a flow diagram for editing an existing settings document.

At 702, GPF APIs are loaded. At 704, schema files are loaded. A selection of how to update the document is made at 706. A settings document can be modified by either adding new client setting instances, modifying existing client setting instances or removing existing client setting instances.

To remove a client setting instance, at 708 a selection is made from the settings document of a client setting instance to remove. That is, a selection is made from the client setting instances configured within the settings document to be removed. At 710, the client setting instance is deleted from the document.

To modify a client setting instance, at 712 a selection is made from the settings document of a client setting instance to modify. At 714, the value(s) of the client setting instance's parameters are changed. A client setting instance can be modified by change the values assigned to its parameters. This will modify what happens when the client setting instance is processed. Note that the priority of the client setting instance within the settings document can also be modified. This is not shown in the diagram. The client setting instances in the document are stored in a prioritized order to determine conflict resolution when the client setting instances are merged during an RSoP calculation. Changing the priority order will modify the outcome of the conflict resolution.

To add a client setting instance, at 716 a selection is made from the schema of a client setting type to configure. That is, a selection of a client setting type of which a client setting instance will be added to the document. At 718, a new client setting instance of the client setting type is added to the document. As noted above, each client setting instance has a basic structure that includes a unique ID for the client setting instance, the associated client setting type in the schema and the options available to the user to customize the client setting instance (i.e., the parameters). The client setting instances are added into the document in a prioritized order that is used to resolve conflicts between the client setting instances when they apply. At 720, values are assigned to the parameters of the new client setting instance.

At 722, the change to the settings document is completed by committing the change. additional modifications to the document can be made as needed by repeating corresponding steps between 706 and 722. At 724, the settings document is saved with the changed settings.

Figure 8:
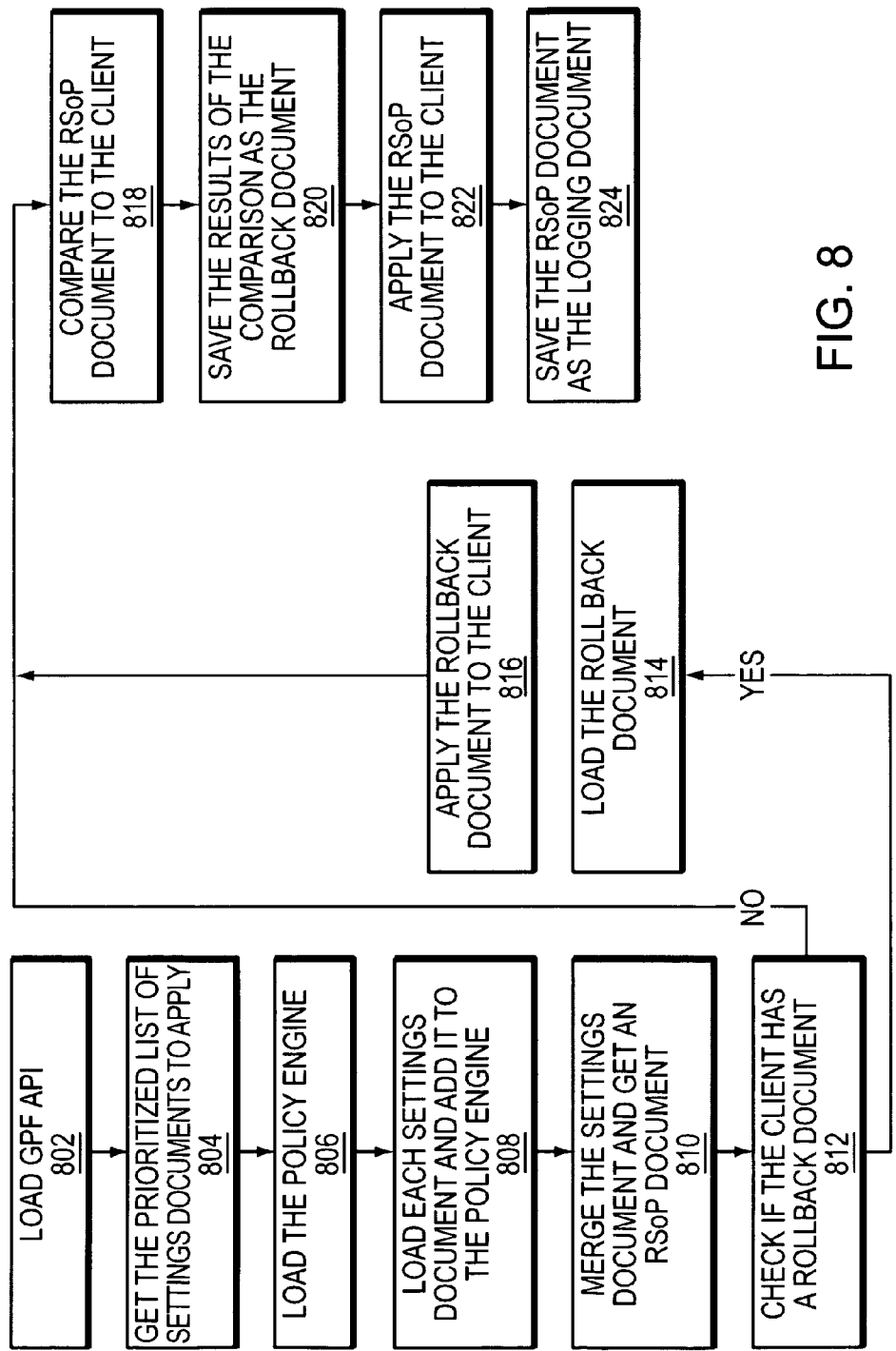

FIG. 8 illustrates a flow diagram for applying policy to a client.

At 802, GPF API are loaded. At 804, a prioritized list of settings documents to apply is obtained. Any policy infrastructure must maintain a prioritized list of the policy documents to enable resolution of conflicts between the client setting instances. In the case of Group Policy this priority is determined by how the GPOs are linked to the Organization Units (OUs). At 806, a policy engine is loaded. The GPF object model includes a policy engine: This is a mechanism for organizing related functionality. The policy engine in the GPF object model hosts the logic for merging settings documents, for generating rollback documents and for applying RSoP documents.

At 808, each settings document is loaded and added to the policy engine. The policy engine maintains a prioritized list of settings documents that it uses as the input into the merge process. At 810, the settings document are merged to provide an RSoP document. The output of the merge process is a single RSoP document that contains the winning-settings that will be applied to the client.

At 812, a check is made to determine if the client has an existing rollback document. When policy is applied to a client, a rollback document is created and stored to use next time policy is applied. If yes, then at 814 the roll back document is loaded and at 816 the rollback document is applied to the client. In particular, the winning-settings in the rollback document are applied to the client. This "rolls back" the changes made to the client last time policy was applied.

Regardless of the existence of the rollback document, at 818 a comparison is made of the RSoP document to the client. That is, a comparison of the RSoP document created by the merge operation to the client to which the policy is being applied. The difference between the two can be described as another RSoP document.

At 820 the results of the comparison are saved as the new rollback document. This is saved for use next time policy is applied. At 822, the RSoP document is applied to the client by applying the winning-settings stored in RSoP document created by the merge operation to the client. How each client setting instance is applied is defined by the client setting type it implements. Application of the client setting instances modifies the client. This is the step that actually modifies the client to match what the administrator has configured in the settings documents.

At 824, the RSoP document is saved as the logging document to be used by RSoP logging reports. By saving this document, the administrators can look to see what policy was last applied to the client in the form of an RSoP logging report.

Figure 9:
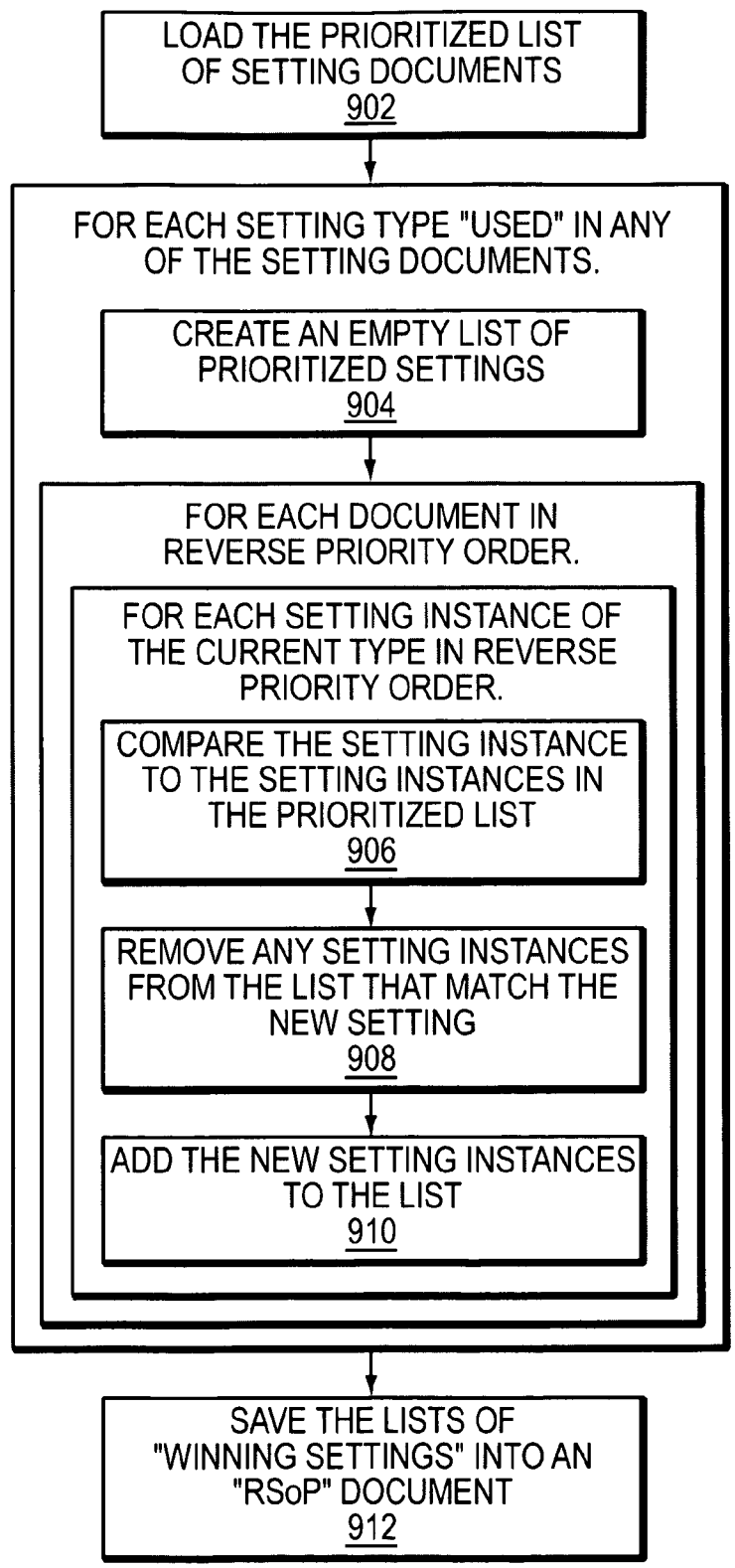

FIG. 9 illustrates a flow diagram for merging policies.

At 902, the prioritized list of setting documents is loaded. All policy infrastructures maintain a prioritized list of the policy documents to enable resolution of conflicts between the client setting instances. In the case of Group Policy this priority is determined by how the GPOs are linked to the Organization Units (OUs).

For each client setting type "used" in any of the setting documents, client setting instances that implement different client setting types can be configured within the policy documents. When client setting instances are merged only client setting instances that implement the same client setting type can merge together. Therefore we evaluate the client setting instances of each client setting type separately.

At 904, an empty list of prioritized settings is created. To merge the client setting instances each one needs to be compared to the other client setting instances that implement this type. To do this a prioritized list is created in which each client setting instance is added one at a time. As each client setting instance is add it is compared to the client setting instances already in the list. Any client setting instances that it matches are removed.

For each document in reverse priority order, the setting documents are iterated through in reverse priority order; lowest priority to highest priority. For each client setting instance of the current type in reverse priority order, the client setting instances are iterated through in reverse priority order; lowest priority to highest priority.

At 906, the client setting instance is compared to the client setting instances in the prioritized list defined by the client setting type. The comparison evaluates the parameter values of two client setting instances to determine if they conflict. This is logic that models how the client setting instances are applied. Two client setting instances conflict if the higher priority client setting instance negates the application of the lower priority client setting instance.

At 908, any client setting instances are removed from the list that match the new setting. The settings that are found to match are removed from the priority list. This process does not impact what changes will be made with the client setting instances are applied because the client setting instances removed are negated by the new client setting instance we are adding anyway.

At 910, the new client setting instance is added to the prioritized list. The client setting instance is always inserted into the list though it may be removed if a higher priority client setting instance conflicts with it.

At 912, the lists of winning-settings are saved into an RSoP document. The built up prioritized list becomes the list of winning-settings stored in the RSoP document.

Figure 10:
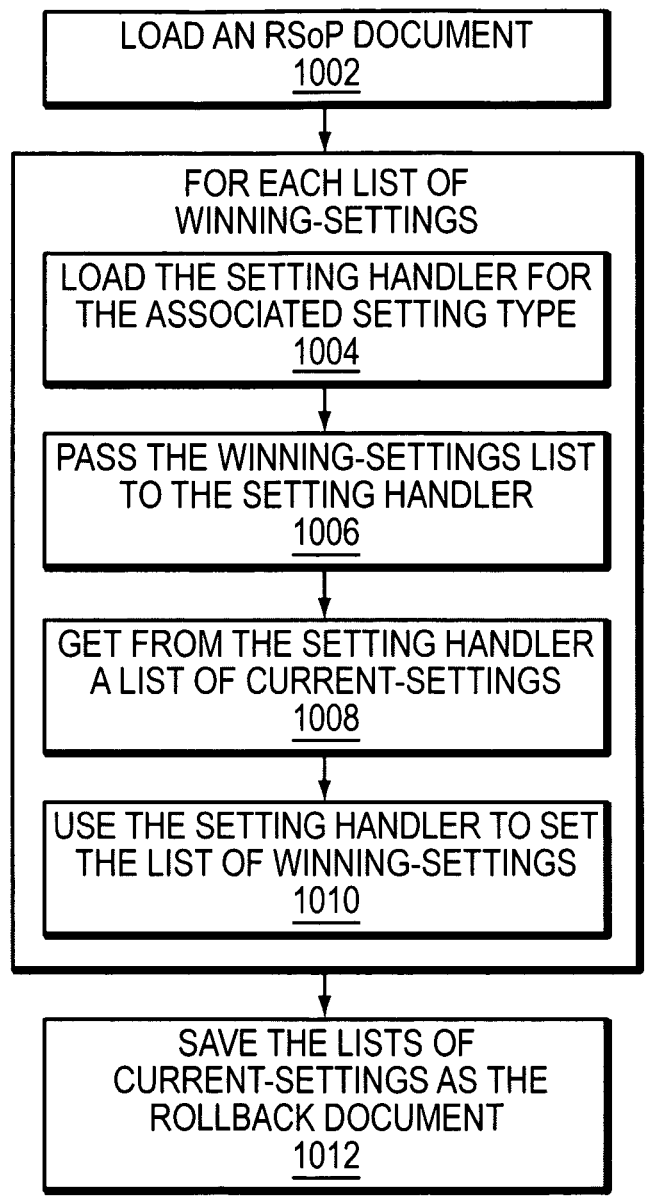

FIG. 10 illustrates a flow diagram for applying policies from an RSoP document.

At 1002, an RSoP Document is loaded. This can be an RSoP document that had been saved to a file or directly taken from a merge policy operation.

An RSoP document can contain multiple lists of winning settings each for a different client setting type. The process of applying client setting instances of each client setting type is defined by the client setting type. All client setting instances of a given client setting type are applied together.

At 1004, a setting handler is loaded for the associated client setting type. Each client setting type has an associated setting handler. The setting handler is the piece of code that knows how to apply a client setting instance to the client. At 1006, the list of winning-settings is passed to the setting handler. It is the settings handler that will actually apply each client setting instance to the client.

At 1008, before applying the winning-settings to the client the current-settings are read so that the application of settings can be undone at a later time. At 1010, the setting handler is used to set the list of winning-settings. Application of the client setting instances in the winning-settings is done via the setting handler. It is at this, and only this, point that the client is modified.

At 1012, the lists of current-settings are saved as the rollback document.

Figure 11:
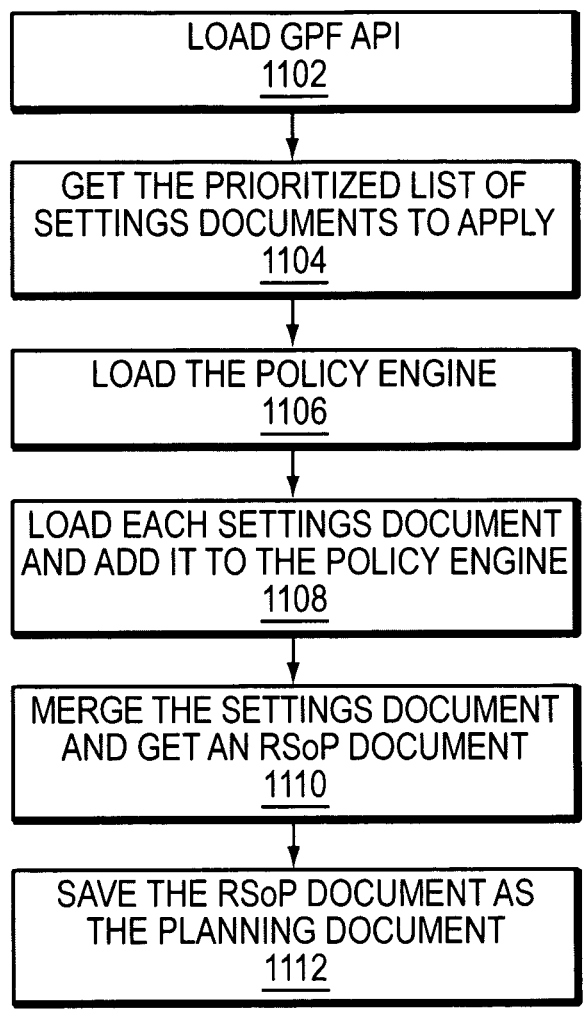

FIG. 11 illustrates a flow diagram of planning the application of policies.

At 1102, GPF API are loaded. At 1104, a prioritized list of settings documents to apply is obtained. Any policy infrastructure must maintain a prioritized list of the policy documents to enable resolution of conflicts between the client setting instances. In the case of Group Policy this priority is determined by how the GPOs are linked to the Organization Units (OUs).

At 1106, a policy engine is loaded. The GPF object model includes a policy engine. This is a mechanism for organizing related functionality. The policy engine in the GPF object model hosts the logic for merging settings documents, for generating rollback documents and for applying RSoP documents.

At 1108, each settings document is loaded and added to the policy engine. The policy engine maintains a prioritized list of settings documents that it uses as the input into the merge process. At 1110, the settings document are merged to provide an RSoP document. The output of the merge process is a single RSoP document that contains the winning-settings that will be applied to the client. At 1112, the RSoP document is saved as the modeling document to be used by RSoP planning reports.

Figure 12:
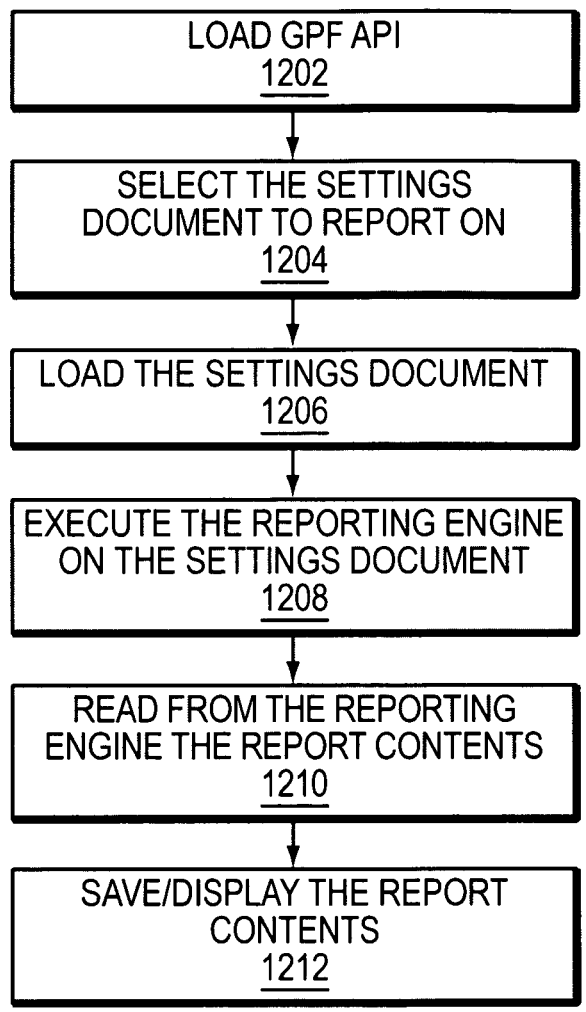

FIG. 12 illustrates a flow diagram for setting document reporting.

At 1202, GPF APIs are loaded. At 1204, the settings document to report on is selected. In Group Policy the settings document will be stored in a GPO so this is analogous to a GPO report.

At 1206, the settings document is loaded. At 1208, the reporting engine is executed on the settings document. The GPF object model includes a reporting engine. This is a mechanism for organizing related functionality. The reporting engine in the GPF object model hosts the logic generating reports on either a settings document or an RSoP document.

At 1210, report contents are read from the reporting engine. The reporting engine supports retrieving the report data in multiple formats including HTML, XML and a GPMC compliant XML. At 1212, the report contents are saved and/or displayed.

Figure 13:
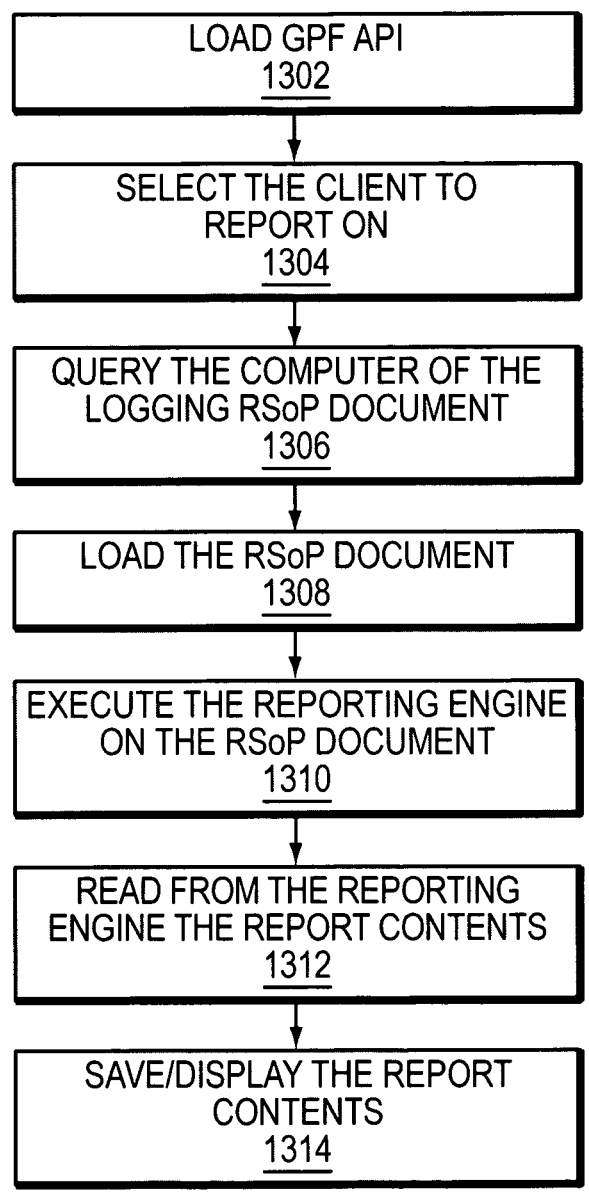

FIG. 13 illustrates a flow diagram for RSoP logging reporting.

At 1302, GPF APIs are loaded. At 1304, the client to report on is selected. Logging reports are generated from RSoP data saved with the client.

At 1306, a query is made of the client for the logging RSoP document. In Group Policy the client is either a computer or a user on a computer. The RSoP data is queried via WMI. GPF supports storing the data in WMI or making it accessible via a WMI provider. It can also be read directly from the file system or an IStream object. At 1308, the RSoP document retrieved from the client is loaded.

At 1310, the reporting engine is executed on the RSoP document. At 1312, report contents are read from the reporting engine. At 1314, the report contents are saved and/or displayed.

Figure 14:
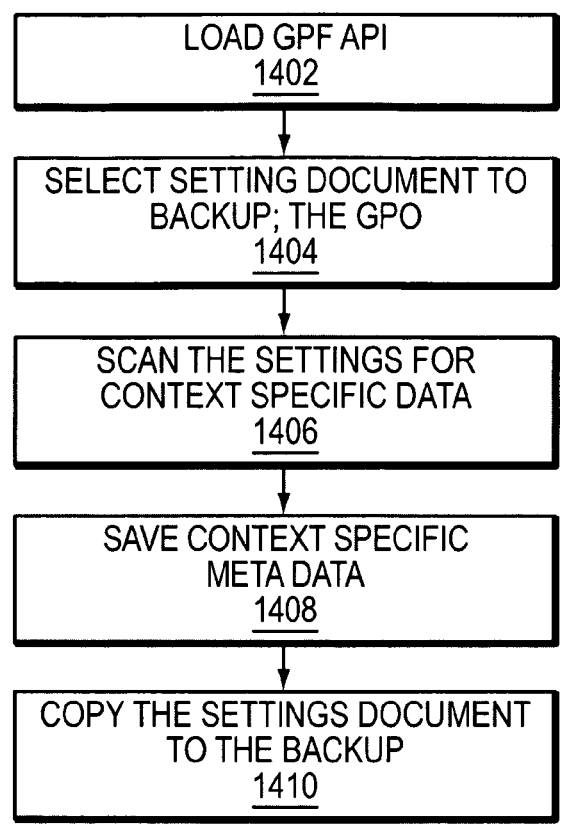

FIG. 14 illustrates a flow diagram for backup settings.

At 1402, GPF APIs are loaded. At 1404, a selection is made of the setting document to backup. In Group Policy the setting document will be stored in a GPO object and will be selected as part of a GPO backup operation.

At 1406, a scan is made of the settings for context specific data. In GPF, context specific data usually appears as values assigned to client setting instance parameters. The client setting type can specify parameters as being context specific. A list is created of all the values assigned to parameters that the client setting type defines as context specific. This list can then be used by the administrator to determine the new values of the context specific data when the setting document is moved.

At 1408, the context specific meta data is saved. The process of migrating context specific data in the settings document can leverage other context specific data not stored in the settings document. This data may be included in the backup in case it is not available when the data is migrated. For example, in determining what new value to assign an e-mail address in a settings document it could be useful to know what user the original e-mail address is assigned to. That information may not be available when the backup is restored but will be available when the backup is created.

At 1410, the settings document is copied to the backup. That is, a copy of the settings document is saved to a backup location. In the case of GPOs the backup may be a folder that contains the GPOs files.

Figure 15:
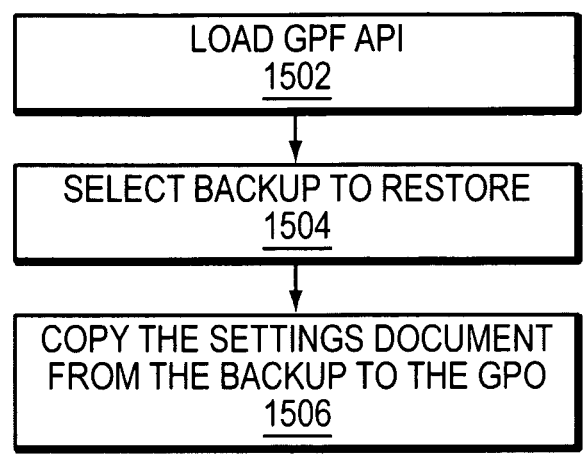

FIG. 15 illustrates a flow diagram for restoring settings.

At 1502, GPF APIs are loaded. At 1504, a selection of a backup to restore is made. That is, selection is made of an older version of the settings document to restore. By definition restore replaces a setting document with an older version of the settings document. This is important because it means the context of the restored document is the same as the context of the backed up document.

At 1504, the settings document is copied from the backup to the restore location. In the case of Group Policy the settings document will be copied into a GPO.

Figure 16:
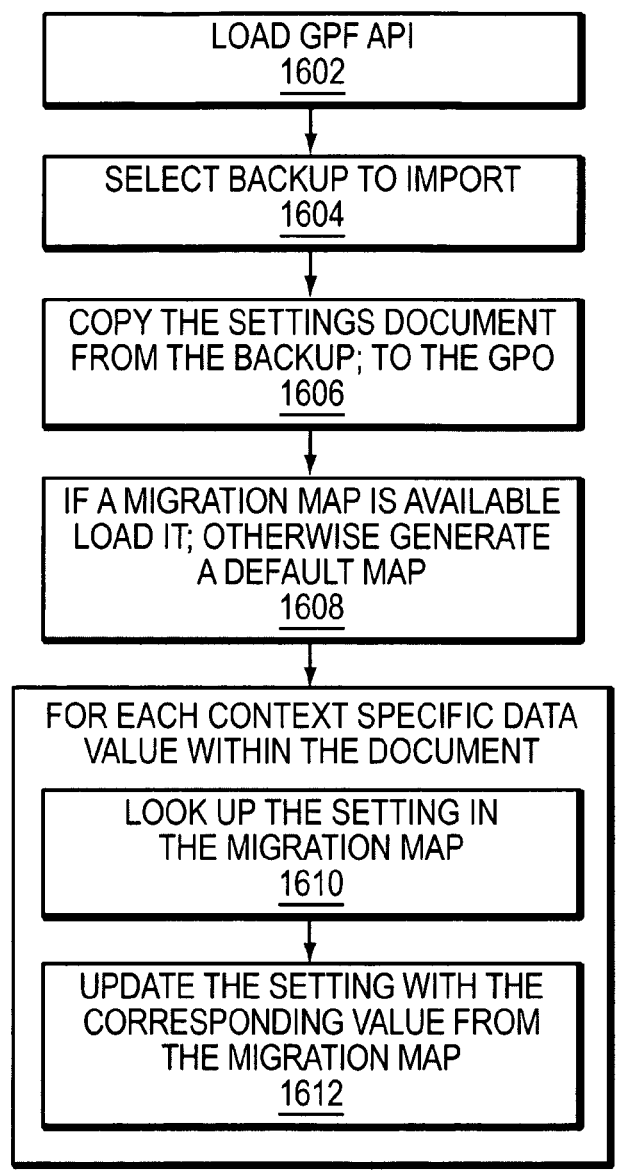

FIG. 16 illustrates a flow diagram for importing settings.

At 1602, GPF APIs are loaded. At 1604, a selection is made of a backup to import. Importing a backup by definition is taking a backup generated in one context and importing its contents into another context. This means that the context specific data within the settings document being imported needs to be migrated.

At 1606, the settings document is copied from the backup to the restore location. In the case of Group Policy the settings document will be copied into a GPO.

At 1608, If a migration map is available it is loaded; otherwise a default map is generated. Migration maps are one to one parings of context specific data in settings document to new values to assign the data when the document is migrated. The user can supply a migration map or one can be generated. If a migration map is generated most context specific data will remain unchanged but some context specific data, such as the file path of the settings document, can automatically be updated.

For each context specific context specific data within the document, at 1610, the setting is looked up in the migration map. That is, a look up of the context specific data in the migration map is made. The entry may be mapped to itself which is particularly likely if the migration map was automatically generated. At 1612, the original context specific data value is replaced with its corresponding value from the migration map.

Figure 17:
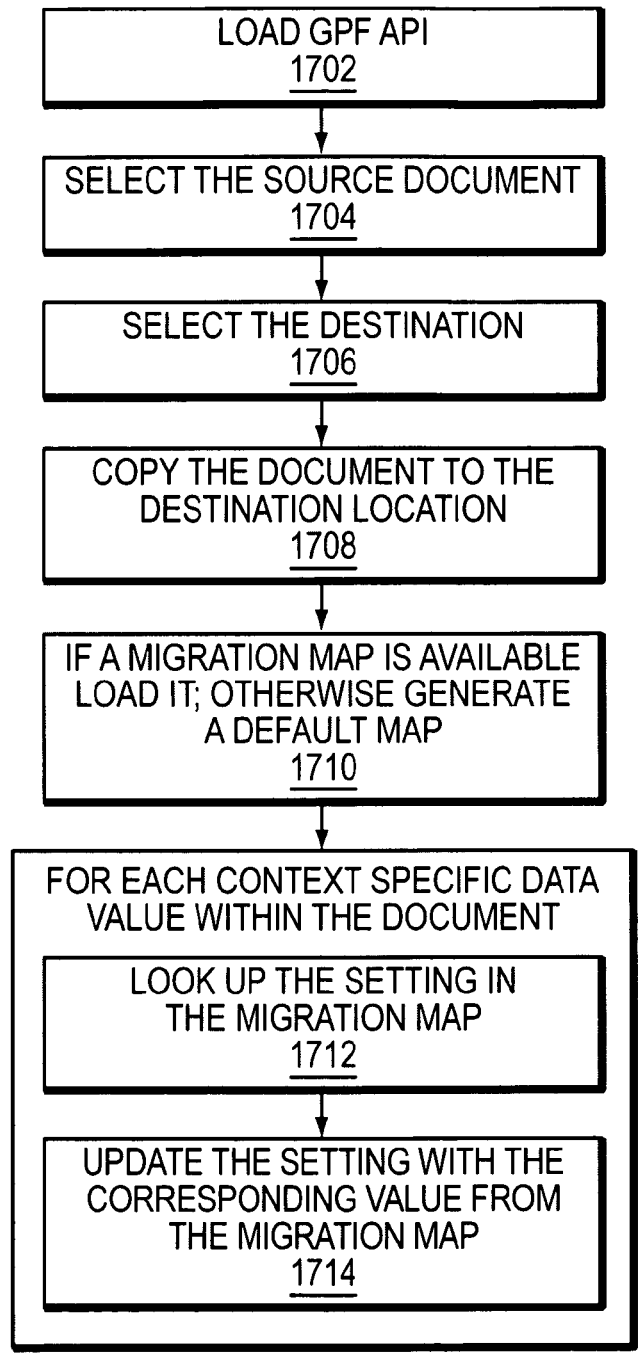

FIG. 17 illustrates a flow diagram for copy and paste.

At 1702, the GPF APIs are loaded. At 1704, the source document is selected. In Group Policy this will usually be a settings document within a GPO. At 1706, a destination document is selected. In Group Policy this will usually be a settings document within a GPO.

At 1708, the selected document is copied to the destination location; it may be copied over an existing document. At 1710, If a migration map is available then it is loaded; otherwise a default map is generated.

For each context specific context specific data within the document, at 1712, the setting is looked up in the migration map. That is, a look up of the context specific data in the migration map is made. The entry may be mapped to itself which is particularly likely if the migration map was automatically generated. At 1714, the original context specific data value is replaced with its corresponding value from the migration map.

FIG. 18 illustrates a structure of the GPF settings document. Each settings document contains schema elements 1802 associated with setting instances configured within the document. Each document contains a prioritized list of setting instances. Each setting instance 1804 contains an ID of its setting type and a list of user parameter/value pairs.

Figure 19:
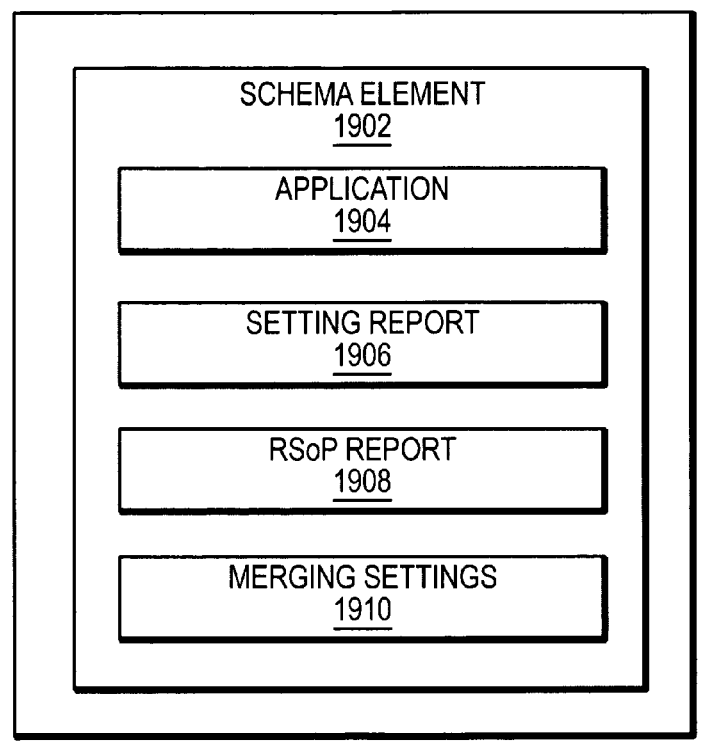
FIG. 19 illustrates and example structure for a schema document.

FIG. 19 illustrates a structure of the schema document. Each document contains the schema elements associated with the setting instances configured within the document. Each schema type 1902 contains: a unique ID that is used to globally identify the schema type; a version that is used for enabling changes to the schema type; a handler ID that is used to identify and load a handler associated with the schema type. Each schema type also contains sections that describe how instances based off of the type behave.

The application section 1904 of each type defines the process used to apply instances of the type to a client. The setting report section 1906 describes how to report on the configured instances of each setting. The RSoP report section 1908 describes how to report on the applied or configured state. The merging settings section describes how to compare instances of the type during the merge process used in generating an RSoP.

GLOSSARY OF TERMS

Document Types: Schema, Setting, RSoP, Language

Schema documents contain types of client settings. A client setting type describes the behavior of a client setting instance.

Settings documents contain instances of settings. A settings document is a collection of client setting instances stored together. The document defines a prioritized order of all the client setting instances stored within it. This order is required to resolve conflicts between client setting instances when they are processed. The merge processes uses the priorities of the client setting instances to generate a modified list of settings that do not conflict. Settings documents can contain other structures to support the processing of the client setting instances such as schema elements.

RSoP documents contain lists of 'winning settings'; The RSoP document contains lists of client setting instances. Each list contains client setting instances that have the same client setting type. There is one list per client setting type. An RSoP document contains a prioritized list of non-conflicting client setting instances. Client setting instances in a settings document may have conflicts with other client setting instances and potentially other ambiguities. Client setting instances in an RSoP document have been processed to resolve all conflicts and ambiguities, these settings are called 'winning settings'. When settings are applied to a client the settings document(s) are first merged together to create an RSoP document. The client setting instances within the RSoP document are then applied.

An RSoP document can also be generated by comparing the client setting instances in an existing RSoP document to a client. The results of this comparison can be stores as a new set of client setting instances in an RSoP document. RSoP documents created in this manner are called rollback documents.

Language documents contain language dependent strings.

Client setting type: The term 'client setting type' refers to a schema element used to describe how to process/manage setting instances. A client setting type is a description of how to implement and manage a setting instance. In programming terms a setting type is analogous to a class and a setting instance is analogous to an object. Each setting type defines a set of parameters. Each instance of a client setting assigns values to each of the parameters defined by the client setting type.

Client setting instance: The term 'client setting instance' refers to a set of configured values that define an operation to be performed. Each client setting instance is associated with a client setting type. The client setting type defines how the setting instance will be processed. The client setting instance also specifies a set parameter/value pairs. The list of parameters is defined by the client setting type; the values are specific to the client setting instance.

For example, a client setting type may allow a user to configure the screen saver options. The type could include two parameters, one for the name of the screen save and one for when to activate it. A setting instance that implements this setting type would assign values to the two parameters; the name of a specific screen saver to use and how long to wait before activating it.

Implements: Each client setting instance is associated with one and only one client setting type that defines how the client setting instance is processed. The term 'implements' is used to refer to this 'one and only one' relationship of the client setting type to the client setting instance. To say a given client setting instance implements a given client setting type is to say that the client setting type is the one associated with the client setting instance. Note: The reverse is not true, there can be multiple client setting instances of a given client setting type.

Rollback document: A rollback document is an RSoP document that was created by comparing an existing RSoP document to a client. The results of this comparison are a set of client setting instances that can be stored in the form of an RSoP document. RSoP documents created in this manner are called rollback documents. This name is due to their relationship with the RSoP document they were derived from. Specifically given an RSoP document D1 and a rollback document R1 generated by comparing D1 to the client if D1 is applied to the client and then R1 is applied to the client then the client remains unchanged. The rollback document R1 can be viewed as 'rolling back' the changes made by D1.

Winning-settings: The term winning-settings within a set of client setting instances is the subset of client setting instances that are not overridden by any other client setting instances in the set when the full set is applied. E.g. Two client setting instances configure the screen saver to activate, one after 5 minutes and one after 10 minutes. The higher priority of these two client setting instances will win out over the other one, while the lower priority one will be negated. Any client setting instances that are not negated by any other client setting instances will be included in the subset of winning-settings.

Current-settings: The current-settings are the values on the client that application of the winning-settings will replace. Current-settings become the winning-settings within the rollback RSoP document. The comparison of the winning-settings to the client to retrieve the current-settings is done by a setting handler.

Setting handler: A handler is a piece of code that implements functionality specific to a particular setting type. For example the application of a client setting instance to a client is done by a client setting handler associated with the client setting instance's setting type.

Client: The term client refers to the target of the policies. Clients are typically computers or users but can also by other entities such as applications and services.

Context specific data: Context specific data is data, stored within a settings document, whose meaning and relevance is based on the context in which the settings document resides. For example, a settings document could contain the e-mail address of a user to which it will be applied. If the settings document is applied to a different user the e-mail address is no longer correct. The context of the settings document has changed and therefore the context specific data is no longer relevant. To properly manage context specific data when changing the context of a setting document the context specific data needs to be updated to reflect the new context. The process of updating context specific data is referred to as migrating the data.

Migration map: Migration maps are one to one parings of context specific data in settings document to new values to assign the data when the document is migrated.

The GPF capability disclosed herein defines an object model for the configuration, application and management of group policies for a computer environment. Polices that are created with the GPF capability are compatible and integrated with MS Group Policy components. Policies that you create are specified in GPF documents, which are represented as GPFDocument objects.

The other basic objects in the model are attributes, settings, and functions. An attribute encapsulates one or more characteristics or components of a computer environment. There are two kinds of settings: client settings and administrator settings. Client settings are based on data that GPF provides by processing the attributes. An administrator setting is essentially a collection of related client settings; it describes the relationship between what is configured by a system administrator and what is applied to the endpoint.

A GPF attribute can represent more than simple information about the environment. You can use complex attributes to implement operations, calculation, filtering, as well as management and shaping of the data. Because GPF allows you to create powerful and complex attributes, you can simplify as well as improve the administration of group policies.

Objects in the model are defined by the GPF API as COM objects. Thus you can use the GPF API to implement your extensions to the MS Group Policy as registered COM objects. GPF uses data specified as XML schema information to process the attributes, settings, and functions correctly when creating the final policy document.

Processing Stages

Using GPF to deploy group policy settings has the following stages, or phases, in the process:

| | |
|---|---|
| Configuration time | When the settings are being configured by a system administrator, typically using a GUI. At configuration time the system administrator specifies the settings to be applied to the endpoint. |
| Apply time | When the policies are applied on the endpoint. At apply time the settings configured by the system administrators are applied. |
| Planning time | When a simulation is run. The simulation is an RSoP planning simulation, also called a modeling simulation. Planning time is similar to apply time, except that some handlers are not designed to run during a simulation, so their settings are not applied at this stage. |
| Report time | When reports and other GPMC operations are performed. Just as with planning time, some handlers cannot be processed at report time. |

Schema

When you use GPF to extend MS Group Policy, the policy configuration is typically implemented by means of GPF attributes, settings and functions—all of which are processed by the GPF Engine. You can use filters to control which settings are applied based on conditions that you specify. The GPF Engine uses schema to determine how to process the policy that the system administrator has configured and also what data to use. The information about processing is defined by object schema and the data is defined by property schema.

Object Schema

You use object schema to specify the implementation of an extension. GPF uses the schema to (1) determine how to process an object—typically how to identify and locate the handler responsible for processing the object—and (2) execute the process.

Error Evaluation and Handling

You can use schema to define rules about the type of data that a handler can process, and also rules about what type of data a handler produces. GPF uses the rules to raise warnings and execute error handling whenever necessary because of unexpected events, conditions, or scenarios.

Reporting

You can use schema to specify how to report on a setting, as well as how to process it. GPF supports four mechanisms for reporting definitions; two of these mechanisms are based on schema specifications.

Versioning

GPF uses the latest version of each schema that is available. When a handler processes an object the version of the schema associated with the object is made accessible to the handler. The handler can use this schema to determine how to process the object.

Property Schema

GPF assigns a typed value, or property, to each input and output parameter for the attribute, setting, and function objects. GPF uses properties to define the input and output data of the objects. The type defines how the value is stored and restrictions on what values the property can have. Basic scalar types such as integer, string, GUID, and date/time are predefined by GPF. When validating output the engine uses the base property types. You can add more types, such as enum and struct types. Specialized types are useful in reporting, because specialized type definitions are used to interpret and display the values.

You can use the schema for an object to define new property types.

Base Property Types

GPF defines the following base property types.

Integer—A 32 or 64 bit integer value (depending on the platform).

String—A generic string value.

Bool—A Boolean value.

GUID—A GUID identifier.

Date Time—A date & time type.

Byte Array—A byte array capable of storing binary data.

Variant—A variant type that can contain the value of any scalar types.

All base property types are scalar—meaning they have a single value associated with them.

Scalar Property Types

All scalar property types, except for the base property types, are derived from another scalar property type. The derivation is part of a hierarchy with one of the base types as the parent type. The parent type defines the default behavior and the memory requirements for the derived type.

Compound Property Types

In GPF, compound property types are similar to the struct data type in the C programming language. A compound property type is a collection of named property types, called members. The members of a compound property can be another compound property, a scalar property, or an ordered collection of properties. The collection can contain both compound and scalar properties. The number of items in the collection is unspecified.

There are no bulk operations defined for compound properties; all operations that access a compound property must access the member properties directly. For example, a list of coordinates defined as x and y pairs must be stored as a collection of coordinate pairs. If the x and y coordinates were stored in separate collections, there is no way to determine which x and y values are associated with each other.

Comparisons

GPF defines some scenarios in which data must be sorted. For these scenarios you can define a property type as a custom comparison expression (or algorithm) defining the logic to use when sorting data for values of that type. The comparison expression must return an integer value. If comparison logic is not specified for a property type, then GPF uses the comparison logic for the base property type. All built in property types have comparison logic associated with them. A comparison algorithm is defined as an expression that can access scalar values specified as left and right. The expression must return a value less than 0 if the left value is less than the right, greater than 0 if the left value is greater than the right, and equal to 0 if left and right are the same.

The simplest comparison expression is for integers:
"$left−$right"
In this expression, the integer on the right is subtracted from the integer on the left.

Constants

Properties can define constant values. A constant value has a name, a property type, a value, and a description. The name must be unique among the constant values. An enumeration type can define restrictions that limit its values to subsets and constants that serve as aliases for the valid values.

Versioning

If a conflict occurs between versions of a property schema object, GPF uses the latest version. Typically a version conflict has the most impact in cases where a property defines a custom comparison rule.

Attributes and Data Processing

GPF uses the output of attributes to get data from the environment in which policies are applied. For example, the name of the computer to which policy is being applied can be obtained by means of an attribute. GPF accesses all data about the environment by means of attributes in order to properly generate rollback information and log the state of the machine for reporting purposes. In addition, attributes provide data that is required for the processing of client settings, filters, and functions.

GPF also uses attributes for manipulating data. For example, attributes can perform math and string calculations, join sets of data, and transform data by excluding subsets and reordering the results. The output of an attribute is used as the input for client settings, filters, functions, or other attributes.

Attribute Structure

An attribute consists of one or more properties. The properties can be any GPF property types, as well as other attribute instances. Typically you specify an attribute according to the data that you want it to provide as output. You can think of the output of an attribute as a kind of structured data type, similar to the C programming language struct. The output consists of uniquely named properties where each property has a data type.

You use schema to specify the properties and data types of an attribute. An attribute can derive its value(s) from other attributes, from configured data, or from any source you choose. To represent this broad range of information, attributes are very flexible. Once an attribute is evaluated, its properties and relationships cannot be modified.

Example of a Simple GPF Attribute

For example, a key characteristic of the environment is the description of the display for the computers in the group. A display attribute that describes visual displays attached to each computer might contain two properties, corresponding to the width and height of the screen in inches.

A conceptual illustration of the display attribute including its name (Display) and its properties (Height, Width), which are integer property types is shown in FIG. 20.

Attributes with More than One Value

In addition to supporting multiple output properties, attributes can support more than one value for each property in its output. Using such "multi-valued" attributes helps to ensure that system administrators do not make incorrect assumptions about the constraints on a client machine. Such attributes can also prevent unnecessary limitations in how policy can be applied. For example, a computer might have more than one monitor.

A conceptual illustration in FIG. 21 shows a case where the second monitor is a bit smaller than the first: In this example, the Display attribute can have either 12 by 16 as the value for its Height and Width properties, or it can have 9 and 12 as the values. In the case of multi-valued attributes, the output of an attribute is referred to as a data set. Similarly each single output set within the data set is referred to as a row.

Restricting Attributes to One Value and One Property

In some cases, it is required that an attribute have just one value (single-valued attribute) and just one property. Also, many kinds of calculations and client settings require a scalar input value. Many aggregation operations also require a scalar value. An attribute that is single-valued (has just one row) is called a singular attribute. An attribute that has just one property is called a scalar attribute. Thus, an attribute that is both singular and scalar has one row and one property.

Attribute Dependencies

Because attributes feed other attributes, they form a hierarchy of dependencies. At the top of the hierarchy are the independent attributes. Independent attributes do not depend on other attributes; either they have constant output values, or they generate their results directly from the environment. Independent attributes are sources of all the data in the attribute hierarchy. The Display attribute is an example of an independent attribute; it does not have any inputs.

Using Output from an Attribute as Input to Another Attribute

Another way to generate complex results is to define an attribute that returns values related to individual rows. In this case you use the input to define a reference between each row in the output and the corresponding row of the input. Using this technique you can build and shape the client setting as required. Enabling detailed logging as part of the process helps the system administrator to verify and troubleshoot complex policy scenarios.

For example, an attribute that calculates the area of the screen display could link to the display attribute containing the height and width, as shown in the conceptual illustration of FIG. 22. In this case the Display attribute generates output that becomes input to the Display Area attribute, which then generates output that can be used as input to other attributes.

Figure 23:
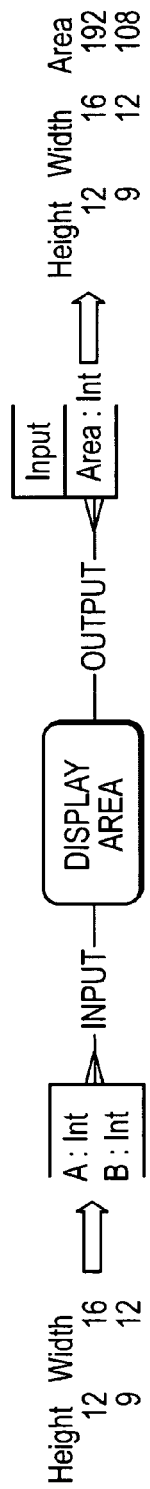

The results of such a workflow when applying the display set from the previous example is a new data set that includes the area as well as the height and width, as shown in the conceptual illustration of FIG. 23.

Embedding Data Sets in the Output of an Attribute

An attribute can embed a related data set into its output, forming a parent-child relationship between the data sets. Settings and other attributes may then evaluate the child data set while referencing information about its parent. They could also use the parent directly. For example, an attribute that enumerates network interface cards could also include the Windows network adapters running on the card as child outputs.

Chains of Attributes that Specify Transformations

You can design attributes that take other attributes as input, transform that data, and generate the results as output. Attributes used in this way are called transformations. You can chain attributes together using transformations to yield output that depends on two or more attributes.

Calculation Attributes

Figure 24:
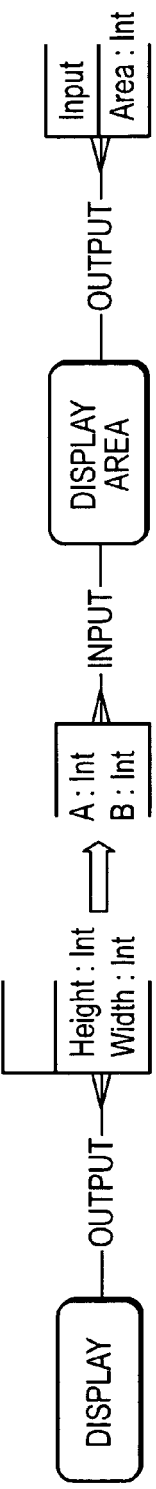

The simplest type of transformation is a calculation attribute. A calculation attribute takes a single attribute as input and calculates a new property. This is done for each row of the input attribute's data set. In the schema illustration of FIG. 24, the Display Area attribute is an example of a calculation attribute. It calculates its output properties using information from a single input.

Subset Attributes

Figure 25:
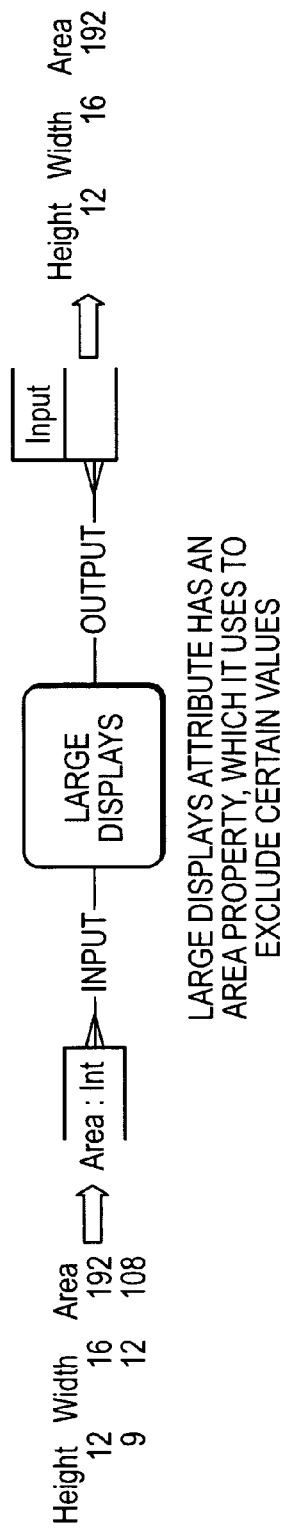

A subset attribute is another kind of transformation attribute. In addition to creating new properties, as you do with calculation attributes, you can use subset attributes to shape the data for later use. Typically a subset attribute excludes values that do not meet certain criteria. You can also use a subset attribute to reorder input data to be used by another attribute. For example, see the Large Displays attribute in the conceptual illustration of FIG. 25. The Large Displays attribute uses the Area property to exclude records that are smaller than 150 sq. inches. This is a requirement for this policy because the smaller screens are not affected by an energy savings registry value that is to be added to the policy.

Join Attributes

Figure 26:
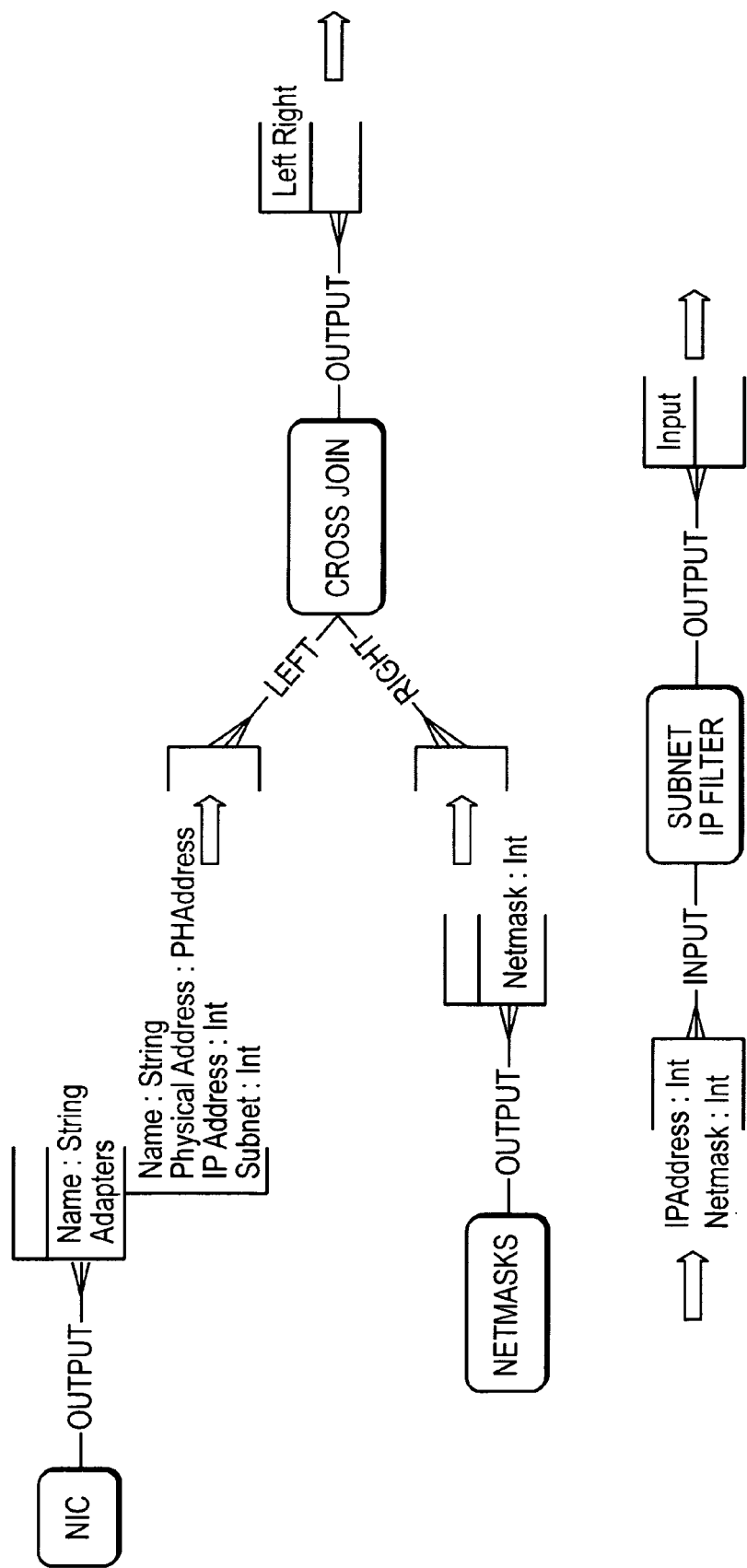

Attributes that require multiple input attributes are known as joins. In some cases, a join attribute combines each permutation from the input and generates the results as output. This operation is known as a cross join. Cross joins are performed automatically in many places by the GPF Engine when evaluating a GPFDocument. A different type of join, known as an equi-join, joins attributes based on the equality of properties. (These operations are similar to outer join and inner join in the SQL programming language.) The conceptual illustration of FIG. 26 shows an example of a join attribute.

In this case the Cross Join attribute gets the list of IP address that are within a list of given subnets (they are the output of the NIC and Netmasks attributes). When the Cross Join attribute is processed it joins the list of subnets with the IP addresses and uses a subnet IP attribute (a transformation attribute) to exclude records that do not match. The resulting list can be used in another attribute (not shown) for a group of client settings that are in the process of being applied.

GPF is associated with an engine that handles the intelligent ordering of attribute evaluation. The GPF Engine is optimized based on a push model, which makes the evaluation process quite robust. This model also allows the engine to evaluate only attributes that are required to calculate policy settings. Each attribute has a property known as input disposition. The input disposition indicates what input is needed next in order to continue processing. The GPF Engine uses this property to evaluate the attributes in the most efficient order. You and your system administrators do not have to perform this task. The push model also enables system administrators to specify how policy should be applied if an error occurs and prevents errors from cascading out of control. Each call is isolated and errors are handled consistently by error catching attributes.

Settings

GPF uses settings objects to represent changes to be made when policy is applied. Settings objects represent two kinds of settings: administrator settings and client settings.

A client setting is an atomic, independent set of values on the target machine. An example of a client setting is a single registry value. A client setting is the only mechanism for defining physical changes to a client machine. In GPF, client settings are configured, managed, and applied by means of the extensive infrastructure of attributes, functions, filters, and expressions that you can use to implement your group policy.

An administrator setting is a much simpler concept; it is essentially a collection of related client settings. Administrator settings provide a mechanism for describing what a system administrator configures in terms of the underlying client settings that are eventually applied to the endpoint. An administrator setting also specifies how to represent its client settings in reports.

Resolution of Contradictory Settings

GPF allows the specification of contradictory client settings within a single policy document. Because GPF supports apply time filters on its settings, it can use them to resolve any contradictory client settings at the time they are applied. For example, two settings can configure a default printer to two different values. Each setting is applied depending on one or more filters that identify where the user is located in the office.

Contradictory client settings might occur because of conflicts in input parameter values at application time. An example is a scenario where an external configuration file is used as a source for setting values. In this case an INI value might be used as the source of registry name/value pairs. At configuration time the contents of the INI file are not known, so it is impossible to resolve the contradictory settings.

Prioritization of Settings in a Policy Document

Groups maintain two ordered lists, one of settings and one of subgroups (subgroups are also called child groups). Settings in parent groups are applied before the settings in the child groups.

Figures 27, 28:
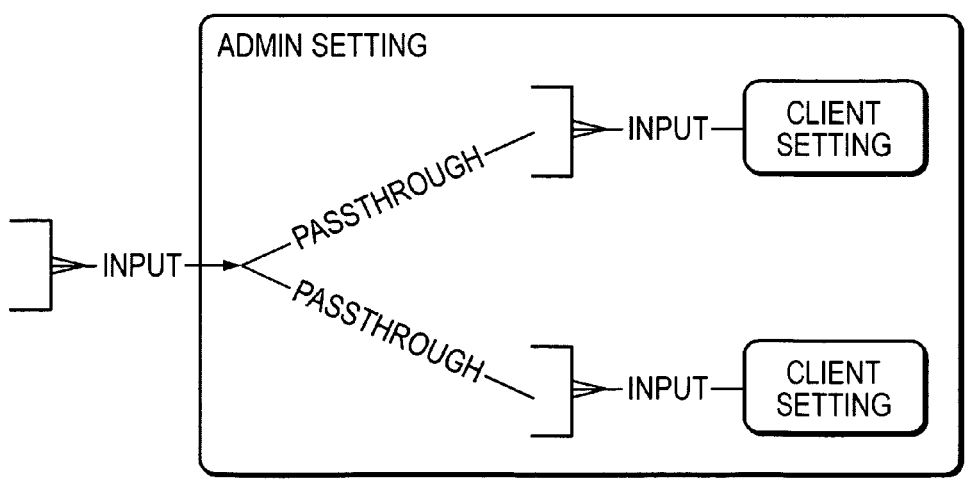

The conceptual illustration in FIG. 27 shows the order of precedence for three groups, where two groups are subgroups, which contain child settings. In this case, settings A1, B1, C1, and D1 are in the parent group, and settings C2, D2, C3, D3, and E1 are in subgroups. C1 and D1 are in a group named Group 1, while C2, D2 are in a subgroup named Group2, and C3, D3 are in subgroup Group 3.

| | |
|---|---|
| C1, D1 | One exchange server Main office |
| C2, D2 and C3, D3 | Two exchange servers Two branch offices |
| C2, D2 | User is in a branch office |
| C1, C2, D1, D2 | Settings applied |

Suppose that settings C1, D1 configure MS Outlook to use the exchange server in a company's main office. Similarly, settings C2, D2 and C3, D3 configure MS Outlook to use the exchange server in each of two branch offices. You can create filters that determine the branch office for a particular user. By applying such filters to the subgroups, Group 2 and Group 3, you can optimize the settings for which exchange server to use.

For instance, suppose that the user is in the Acme branch office, and this causes the filter on Group 2 to evaluate as true and the filter on Group 3 as false. This result causes settings C2, D2, which are in Group 2 to apply, but the settings in Group 3 do not apply. Because settings C2, D2 have higher precedence than settings C1, D1 they override settings C1, D1. Therefore, in this scenario, MS Outlook ends up using the Acme exchange server as specified by C2, D2.

Client Setting Structure

Client settings are similar to attributes but unlike attributes they have some restrictions:

All client settings have a single multi-valued input and single multi-valued output.

The output parameters must be the same as the input parameters.

The output must include an input-reference.

A client setting schema can also specify criteria for how instances of the client setting should be displayed in reports.

The following pseudo-code in XML is a schema fragment that shows some sample input parameters for a registry client setting.

```
<clientSettingType name="registrySetting" ... >
    <inputTypes>
        <inputType          name="registryOperation"
            singular="true">
            <parameterTypes>
            <parameterType                   name="key"
                type="$registrySettingRoot"/>
            <parameterType name="path" type="string"/>
            <parameterType name="name" type="string"/>
            <parameterType name="value" type="variant"/>
            <parameterType                  name="type"
                type="$registrySettingType"/>
            <parameterType             name="operation"
                type="$registrySettingOperation"/>
            </parameterTypes>
        </inputType>
    </inputTypes>
    ...
</clientSettingType>
```

Application of Settings

GPF applies settings in bulk. The first step is to generate a data set of all the settings of a given type. The data set is passed to the handler that is responsible for applying the settings. At this point the handler becomes responsible for applying the settings. The settings should be defined in a manner that the handler can apply each setting individually.

Precedence and Merging of Client Settings

GPF generates a list of all the client settings; the list is based on the order in which the settings are stored in groups. Next, GPF applies filters to the list (that is, GPF removes from the list any settings associated with filters that resolve to false). The resulting list includes all the client settings to be logically applied. It is called the list of all active client settings.

Applying each setting in this list in order from lowest to highest precedence would achieve the desired configuration of the endpoint, that is, the configuration that the system administrator intended, except for the fact that the list of active client settings typically contains settings that conflict and override each other. For example, if a client setting enables the "Hide Desktop Icons" setting and a second, higher precedence, client setting disables the "Hide Desktop Icons" setting, the merge rules for the client setting exclude the lower precedence setting. Therefore, before applying the client settings, the list of active client settings is further modified such that it contains only winning client settings. A winning client setting is the setting that is not excluded when a conflict is resolved. At this point the list of active client settings no longer contains any settings that override, or contradict, other settings. This process of generating a list of winning client settings is referred to as the merging of the settings.

Each setting type defines merge rules for the merging of the settings of that type. The merge rules compare the values of the input parameters of the two settings that are contradictory. If the rules determine that the two settings match, the lower precedence setting is excluded from the set of winning settings.

Output and Rollback of Client Settings

A client setting generates as output the current value of any setting that it changes. For example, if a client setting sets a registry value, the setting generates as output the value of the registry setting; this occurs before GPF applies the client setting. Because the output of a client setting is required to have the same parameters as its input, the output of a client setting can be passed as input to itself; this is how rollback of a client setting is accomplished.

GPF saves the output of all client settings as rollback data after each application of policy. The next time policy is applied, GPF adds the previously saved rollback data to the list of policy documents as the lowest priority document.

GPF handles rollback data as follows:
  If the policy documents do not change from one application to the next, all of the settings in the rollback data are canceled by 'winning' client settings.
  If policy documents do change from one application to the next (because settings are removed), a subset of the rollback settings are mixed in with the winning client settings. In this way the rollback settings replace the settings that have been removed.

Backward Compatibility

All object instances of a given object type are processed by a single handler, irrespective of the versions of the instances. In this way the handlers are responsible for insuring that they are backwards compatible.

Administrator Settings

Typically system administrators specify settings only in a graphical user interface (GUI) that shows an abstract representation of the actual client settings, or combinations of client settings. The GUI connects to the client settings by means of administrator settings—each administrator setting that you develop defines a client setting or group of client settings that are to become visible (as an abstraction) to users of a GUI. Specifications by the user of the GUI can affect more than one client setting insofar as the underlying administrative setting defines more than one client setting.

For example, MS Administrative Templates has a client setting named "Slow network connection timeout for user profiles" that takes two values: the connection speed and the time out period. The two values are stored in two separate registry values when they are applied. The setting "Slow network connection timeout for user profiles" corresponds to an administrator setting, while each of the two registry values corresponds to a client setting.

When working with settings in the GUI a system administrator sees and works only with the administrator setting, not the client settings that you as the developer have defined as part of the administrator setting. Furthermore, administrative settings do not modify how settings are applied.

GPF does not define how a GUI presents the settings, but GPF is responsible for reporting on the settings. GPF uses the administrator settings to create a report that shows what the end user expects to see, rather than low-level details about client settings.

Structure of Administrator Settings

Administrator settings are defined by schema. An administrator setting does not have a corresponding handler. The schema for an administrator setting defines a static number of configured member client settings. Although the number of member client settings is static, administrator settings can pass inputs to them. When inputs are passed, the number of client settings that actually get configured expands to the number of rows in the input data set.

The conceptual illustration of FIG. 28 shows an administrator setting that has one input, which is used as a parameter for each of two client settings. In this case, the number of client settings is static: two. At configuration time a system administrator can specify an input parameter to be used as input to each of the two client settings contained by the administrator setting. The system administrator cannot access the underlying client settings directly.

In some cases the administrator setting schema might map directly to a single configurable client setting. Also, you can configure any setting to be empty at apply time—for example if the settings to apply are to be read from a data source, such as an .ini file. (Note that using a data source in this manner is not generally recommended, but it might be necessary if you are required to support legacy software.)

The workflow defining the input parameters of client settings within an administrator setting can include expressions and attributes.

Example of administrator setting that specifies input to a client setting

Administrator settings can be used to make configuring particular kinds of settings easier. For example, you can implement the "Hide Desktop Icons" administrative templates as an administrator setting. The setting configures the following registry value: HKCU\Software\Microsoft\Windows\CurrentVersion\Policies\Explorer\NoDesktop The possible values for this setting are 1 (enable) or 0 (disable).

Figure 29:
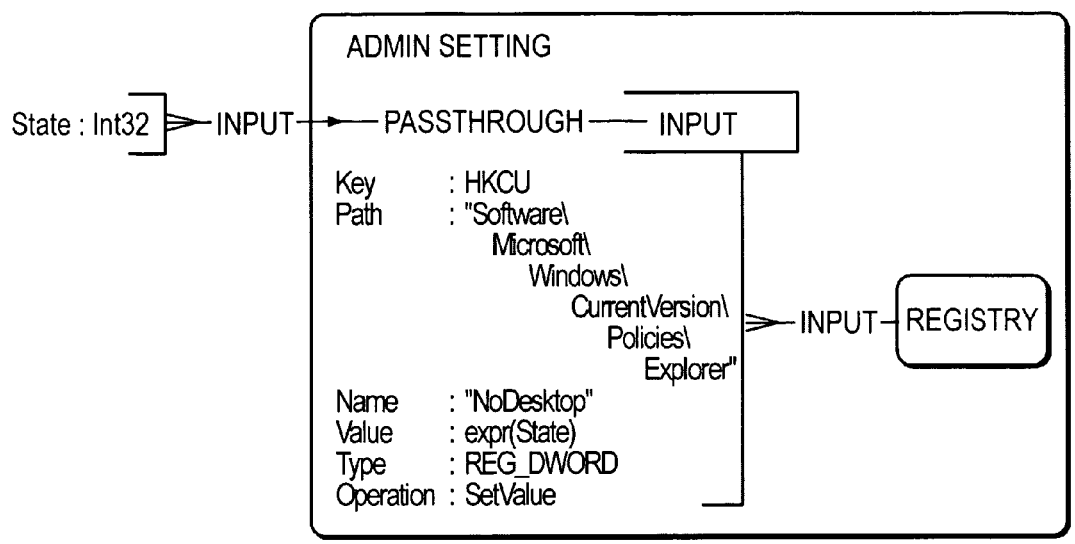

The conceptual illustration of FIG. 29 shows how the administrator setting is defined in the schema. In this case the schema defines the input for the administrator setting as a single integer value. This value then maps to the registry-value input parameter for the single member client registry setting. The schema for the administrator setting assigns constant values to the other input parameters.

At configuration time the only input parameter is the State value, which is mapped to the Value input parameter of the registry setting. This mapping is specified in the schema as expr(State). This is an example of mapping directly to an expression on the client setting's 'value' input parameter.

Administrator Setting Templates

To facilitate reuse of common structure, it is recommended that you create a template for your administrator settings. You can create a template as a container of another template; you can then use the contained template to declare variable names for the constant values that are used in the setting defined by the container template. An administrator setting can then declare itself, using the template and providing values for the constants defined by the template.

Administrator Settings and Groups

A group can contain both client and administrator settings. When GPF generates the complete list of client settings, it replaces each administrator setting within a group by the client settings that are specified indirectly by the administrator setting. The replacement process occurs according to the precedence specified by the administrator setting. To maintain a complete, deterministic, order of precedence for all client settings, administrator settings must specify the relative precedence of the client settings they contain.

Figure 30:
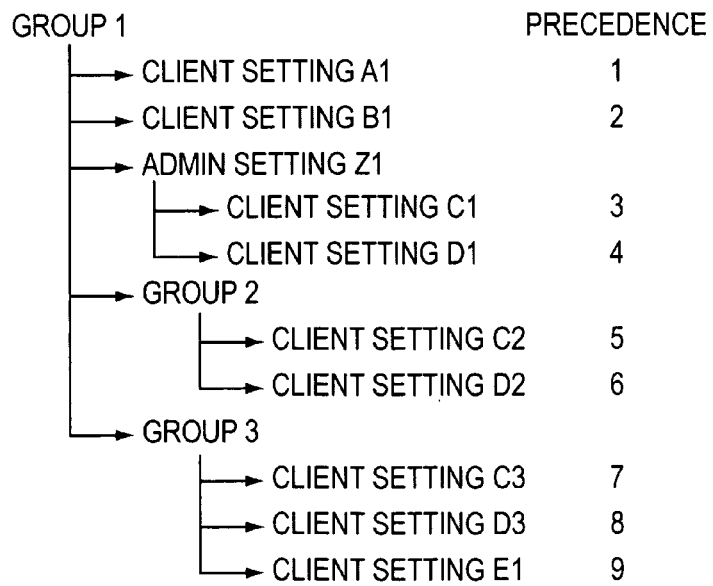

For example, in the conceptual illustration of FIG. 30, the administrator setting Z1 has two client settings C1 and D1. In this case, D1 has higher precedence than C1.

Reporting on Administrator Settings

In general, GPF generates reports of administrator and client settings in the same way. For both kinds of settings the important distinction is between GPO report data and RSoP report data. All settings are defined by the values of their input parameters and, therefore, a description of a setting is dependent on those values. GPO reports often depend on the values of input parameters that are defined by expressions that are not resolved until apply time. To work around this issue, a typical design is to use reporting parameters to allow the specification, at configuration time, of values required for reporting.

When GPF generates report data on RSoP results, all expressions have been fully evaluated. However, there is not a definitive mapping of the client settings in the RSoP results to their corresponding administrator settings. To work around this problem, an administrator setting's RSoP report workflow must include a mechanism to search all the winning client settings to determine which client settings are associated with each administrator setting.

Overview of Expressions

In general, an expression is any piece of code that when evaluated, returns a value. In GPF, expressions provide values to settings, filters, and attributes.

The following GPF components can be used in expressions in a GPFDocument:
Functions
Operators
Constants
Property references GPF provides a set of predefined functions and operators, which you can expand or override at apply time, planning time or report time.

Uses for Expressions

The following are some typical ways to use GPF expressions:

Write complex mappings among attributes, filters, and settings, or write a tool that does this.

Bind the output of an attribute to the input of another attribute, a client setting, or an administrator setting.

Define constant values for a parameter.

Expression Syntax and Example

Expressions in GPFDocument are similar to expressions in the C programming language, except that GPF expressions support fewer tokens. The order of operations in GPF expressions is the same as for C expressions, including the use of parentheses to indicate highest precedence.

An example of a complex GPF expression that uses functions, parentheses, constants, and property references is shown in the following code, where GetYear, StringToInt and SubString are functions:

(GetYear($currentDate.Date)−StringToInt(SubString("06/20/1969",7,10)))/10

The operations calculate how many decades have passed since Neil Armstrong walked on the moon.

1. First, the substring "1969" is pulled from the date string "06/20/1969".
2. Then the string "1969" is converted to the number 1969.
3. Next the "GetYear" function returns the year of the current date. In this case 'currentDate' is an instance of a singular attribute and 'Date' is an output parameter containing a DateTime value.
4. 1969 is subtracted from the current number to get the number of years since Armstrong's walk.
5. Finally the number of years is divided by the numeric constant, 10, to get the number of decades.

Functions

Functions are the core component of expressions in GPF. GPF functions are attributes with the following limitations: functions take only scalar parameters and functions return one and only one scalar parameter, that is, a singular scalar parameter. Functions are a useful as a shortcut for performing operations that could be done with attributes. They are also more readily reused than attributes.

Function Syntax

GPF supports variadic functions, which are functions that take a variable number of arguments. A function takes an array of values, and returns a single value. It can also validate its arguments at configuration time to ensure a valid expression has been entered. The functions collection in the GPFDocument object contains the implementation for each predefined function. You can extend the function library, as well as override existing implementations.

Operators

Operators are special types of functions. They have the following characteristics:

- Operators can be unary or binary.
- Operator precedence is fixed.
- You cannot define new operator symbols.
- Operators are mapped to functions using the Operators collection on the GPFDocument. The signature in each operator maps the operator symbol and associated types to a function.
- The mappings in GPFDocument have default definitions, which you can modify either to add new mappings or to change the functions that are specified in the default definitions.

Constants and Constant Expressions

Constants are constant values interpreted at apply time. GPF expressions support constant numeric types as well as strings. Other types of constant values (such as GUID values) can be built using functions, integers, and strings.

You typically specify a constant value when a value is independent of its context in GPFDocument and of anything external to GPF. Constant expressions are particularly useful in reporting operations where it is not possible to evaluate the values of attributes at apply time. For example, an attribute such as the string concatenate attribute can be evaluated under any context. In contrast, an attribute that retrieves the name of the computer to which the settings are to be applied cannot be evaluated at configuration time, because the target computer is unknown at that stage. GPF supports the following kinds of constants: explicit constants, aliased constants, and constant expressions.

Explicit Constants

Figure 31:
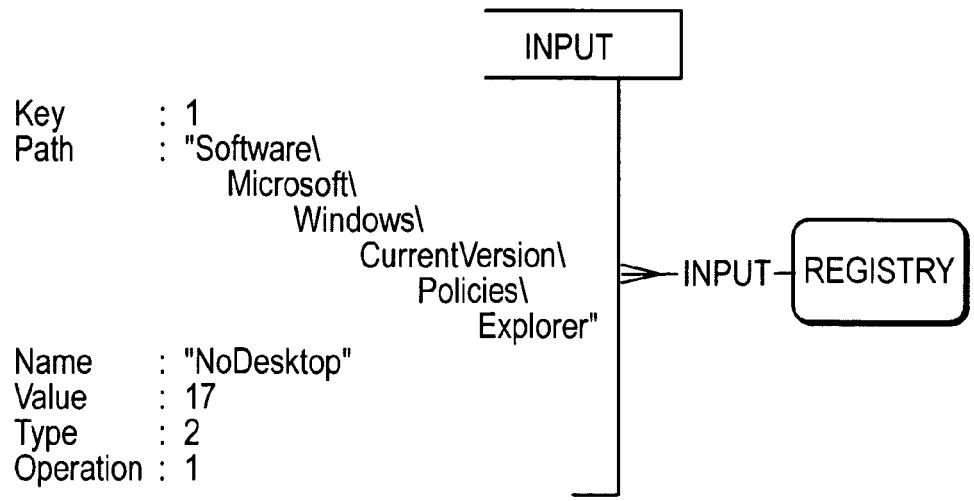

Explicit constants are cases where the configuration provides the constant value. For example, a registry setting can be configured as shown in the conceptual illustration of FIG. 31. In this example, the input parameters (Key, Path, Name, Value, Type, and Operation) are assigned explicit constants as their values.

Aliased Constants

Figure 32:
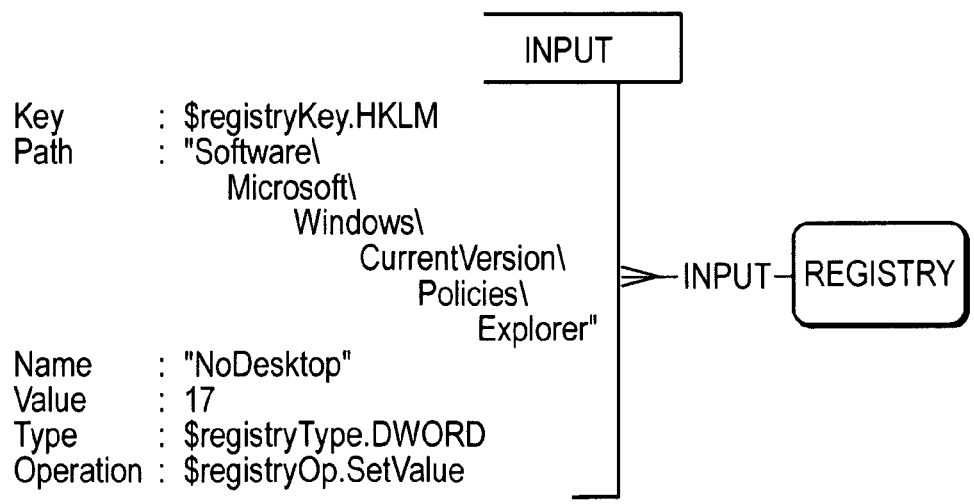

Aliased constants are cases where the constant value is assigned a name that can be referenced. For example, using aliased constants a registry setting could be configured as shown in the conceptual illustration of FIG. 32. In this example, three of the input parameters (Key, Type, and Operation) are assigned aliased constants as their values.

Constant Expressions

Figure 33:
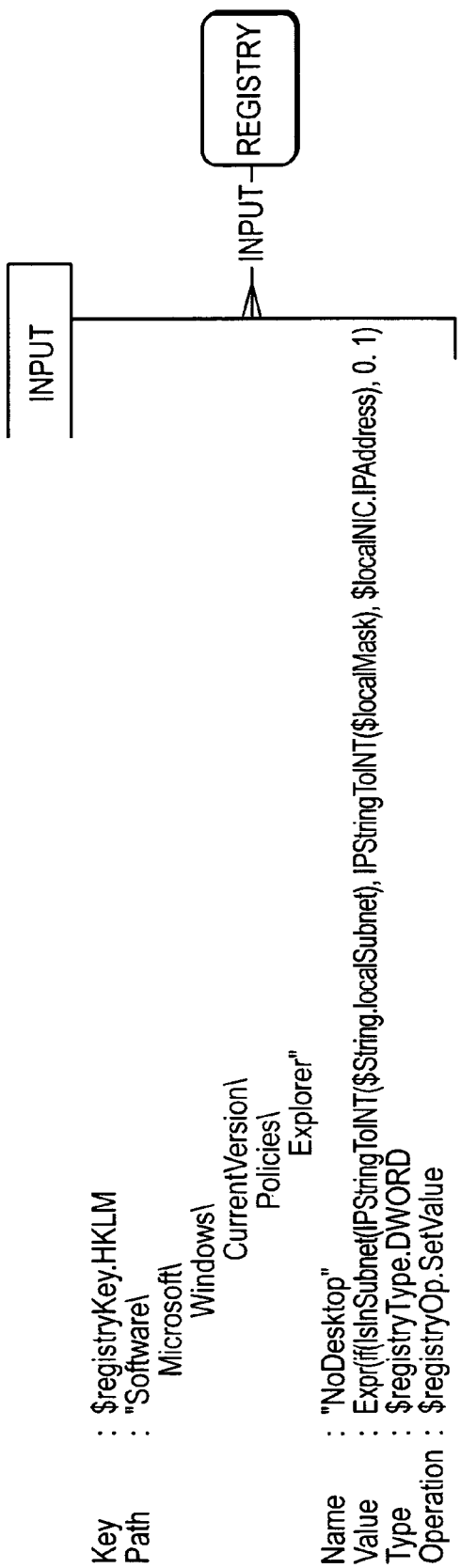

Constant expressions are expressions where all the parameters are constants. For example, see the conceptual illustration of FIG. 33. In this example, the Value input parameter is assigned its value by means of the following constant expression:

Expr(if(IsInSubnet(IPStringToINT($String.localSubnet), IPStringToINT($localMask), $localNIC.IPAddress), 0, 1)

This expression means that if the user is connected locally the desktop is shown, but the user is connected remotely, the desktop is hidden.

Property References

GPF evaluates each expression in the context of the input to a setting, filter, or attribute. If the input is attached to the output of an attribute, the expression can reference the properties of the output directly by name; this reference is called a property reference constant.

In GPF a dot operator (.) is used to access nested properties. This syntax is identical to the syntax in the C programming language. You must also use the dollar sign "$" as a prefix to specify the attribute name in the reference. (The dollar sign is needed because property references might refer to attributes with scalar outputs; attributes with scalar outputs do not need to be assigned as input in order to be referenced.)

The following code example shows two property references, $registrySettingType.HKLM and $registrySettingType.HKCU.

Or(Root=$_{registrySettingType.HKLM},
Root=$_{registrySettingType.HKCU})

You could use this expression to determine whether registry settings, which have the input parameter 'Root', are being applied under either the Local Machine (HKLM) or the Current User HKCU) registry keys but not under Classes Root (HKCR).

Filters

A filter is a Boolean expression, where each element of the expression is either a reference to another filter or an expression that resolves to a Boolean value. In GPF you can use filters to control which settings are applied based on conditions that you specify. For example, you can specify a filter that causes GPF to apply a setting only if the operating system is MS Windows Vista or later.

Compound Filters

A compound filter is a collection of elements that are evaluated using either compound AND or compound OR. Filter elements are evaluated in order, with each element evaluating to true or false. The filter evaluates only as many elements as it needs to resolve its value—compound filters elements later in the list may never be evaluated. Elements that are not evaluated are considered to be unresolved.

Either-Or Filters

An either-or filter is a pair of filter elements. This kind of filter evaluates to true if one element is true and the other is false. This is comparable to the exclusive OR (XOR) operator, a Boolean operator that returns a value of true only if exactly one of its operands is true.

Descriptions and Reports

Each filter element defines three display strings that GPF uses to describe the filter and its results. These string elements are Description, True Result, and False Result. All three of the options can be assigned expressions, but Description must be a constant or a constant expression.

You can assign values to each of these display strings. When it creates the report, GPF combines the descriptions of each element into an overall description of the filter. In this way, GPF automates the process of generating the filter description.

For example, the filter element that evaluates whether a computer is in the home office subnet might define the following string elements:

Description: "Is the computer IP Address in the home office subnet?"
True Result: "The computer IP Address is in the home office subnet"
False Result: "The computer IP Address is not in the home office subnet"
Another filter might check whether the endpoint is an end user and have similar string elements:
Description: "Is the endpoint an end user?"
True Result: "The endpoint is an end user"
False Result: "The endpoint is not an end user"
Then, when a compound filter checks the subnet and also whether the endpoint is a user, the following description is an example of what might be generated automatically by GPF:
The computer IP Address is in the home office subnet and the endpoint is an end user.

Filters in Relation to Transformation Attributes

The main reason to use a filter instead of a transformation attribute is the ease of reporting that filters provide. Attributes are a fully extensible infrastructure. GPF interacts with attributes by means of the schema and the handler interface. Thus GPF cannot determine the behavior of attributes; it can only instantiate them and process the results. In the case of filters, GPF can determine exactly the behavior and description as well as the process, and it can use this information to generate reports automatically.

Group Objects

The primary role of a group object is to determine the order of precedence of the settings. Groups maintain lists of client and administrator settings based on order of precedence. GPF maintains these lists so as to maintain the correct order of the settings according to precedence. Groups can have subgroups, which are also based on order of precedence.

For a setting to be applied it must be assigned to a group. A setting cannot be assigned to more than one group. If a setting must be applied under multiple conditions, you can create a compound filter to describe the various conditions. Alternatively, the setting can be copied using the GPF API and the copy inserted into another position in the order of precedence.

The secondary role of group objects is to allow filters to be applied to groups of related client and administrator settings. Applying a filter to a group is equivalent to applying the filter to each client and administrator setting within the group.

Reporting Data Structures

The generation of reports, both GPO reports and RSoP reports, leverages the attribute, function and expression model used for the application of policy. Also, GPF reports define two data structures that you can use to describe how to display the settings in the report—setting tables and setting groupings.

Setting Tables

Typically you use tables that contain settings, or setting tables, as the mechanism for displaying setting data. GPF allows you to define information about the design of the tables in the schema. For instance, you can specify how many columns to have, what headers to use, and how the tables are displayed. You can use table sink operators to add rows to setting tables.

Setting Groupings

Setting groupings are data structures defined in the schema. Use them to specify how settings should be grouped together in the reports. Setting groupings have no configuration time or apply time elements. They consist entirely of logic for putting settings into groupings for display. They are processed only when an HTML report is generated.

It should be understood that the block diagrams of FIGS. 1-5 and the flow diagrams of FIGS. 6-17 are examples that can include more or fewer components, be partitioned into subunits, or be implemented in different combinations. Moreover, the flow diagrams and components of the block diagrams may be implemented in hardware, firmware, or software. If implemented in software, the software may be written in any suitable software language. The software may be embodied on any form of computer readable medium, such as RAM, ROM, or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
    storing policy settings for a group policy infrastructure in a settings document, the settings document having a common document format that defines how to implement policy operations on the policy settings, the policy operations including configuration, application, analysis, reporting and auditing; and
    processing the settings document to implement any of the policy operations within the group policy infrastructure;
    wherein the policy configuration operation includes:
        loading a schema document that defines configurable policy settings;
        selecting from the schema document a setting type to configure;
        creating an instance of the selected setting type in the settings document;
        setting a user parameter value to customize the setting instance.

2. The method of claim 1 wherein the policy application operation includes:
    loading plural settings documents, each settings document including policy settings;
    merging the policy settings from the plural settings documents based on a priority to generate a resultant set of policy (RSoP) document;
    applying the merged policy settings from the RSoP document to a client;
    storing the RSoP document as an RSoP logging document.

3. The method of claim 1 wherein the policy analysis operation includes:
    loading plural settings documents, each settings document including policy settings;
    merging the policy settings from the plural settings documents based on a priority to generate a resultant set of policy (RSoP) document;
    storing the RSoP document as an RSoP planning document;
    generating a report based on the RSoP planning document.

4. The method of claim 1 wherein the policy reporting operation includes:
    loading the settings document;
    generating a report based on the settings document.

5. A method comprising:
    storing policy settings for a group policy infrastructure in a settings document, the settings document having a common document format that defines how to implement policy operations on the policy settings, the policy operations including configuration, application, analysis, reporting and auditing; and
    processing the settings document to implement any of the policy operations within the group policy infrastructure;

wherein the policy application operation includes:
  loading plural settings documents, each settings document including policy settings;
  merging the policy settings from the plural settings documents based on a priority to generate a resultant set of policy (RSoP) document;
  applying the merged policy settings from the RSoP document to a client;
  storing the RSoP document as an RSoP logging document;
wherein merging includes:
  comparing each setting instance of a current type to setting instances in a prioritized list of settings in reverse priority order;
  removing any setting instances from the list that match a new setting instance;
  adding the new setting instance to the list.

6. The method of claim 5 wherein the policy application operation further includes:
  checking whether a rollback document exists;
  if the rollback document exists, applying policy settings from the rollback document to the client; and
  saving the merged policy settings from the RSoP document as the rollback document prior to applying the merged policy settings.

7. A method comprising:
  storing policy settings for a group policy infrastructure in a settings document, the settings document having a common document format that defines how to implement policy operations on the policy settings, the policy operations including configuration, application, analysis, reporting and auditing; and
  processing the settings document to implement any of the policy operations within the group policy infrastructure;
wherein the policy auditing operation includes:
  selecting a computer on which to report;
  loading an RSoP logging document from the selected computer;
  generating a report based on the RSoP logging document.

8. The method of claim 7 wherein the policy auditing operation further includes:
  evaluating each winning-setting instance in the RSoP document;
  identifying each setting instance corresponding setting type;
  using the setting type definition to describe the setting instance;
  generating a report element describing the setting instance.

9. A method comprising:
  storing policy settings for a group policy infrastructure in a settings document, the settings document having a common document format that defines how to implement policy operations on the policy settings, the policy operations including configuration, application, analysis, reporting and auditing; and
  processing the settings document to implement any of the policy operations within the group policy infrastructure;
wherein the policy analysis operation includes:
  loading plural settings documents, each settings document including policy settings;
  merging the policy settings from the plural settings documents based on a priority to generate a resultant set of policy (RSoP) document;
  storing the RSoP document as an RSoP planning document;
  generating a report based on the RSoP planning document;
wherein the policy analysis operation further includes:
  evaluating each winning-setting instance in the RSoP document;
  identifying each setting instance corresponding setting type;
  using the setting type definition to describe the setting instance;
  generating a report element describing the setting instance.

10. The method of claim 9 wherein merging includes:
  comparing each setting instance of a current type to setting instances in a prioritized list of settings in reverse priority order;
  removing any setting instances from the list that match a new setting instance;
  adding the new setting instance to the list.

11. A method comprising:
  storing policy settings for a group policy infrastructure in a settings document, the settings document having a common document format that defines how to implement policy operations on the policy settings, the policy operations including configuration, application, analysis, reporting and auditing; and
  processing the settings document to implement any of the policy operations within the group policy infrastructure;
wherein the policy reporting operation includes:
  loading the settings document;
  generating a report based on the settings document;
wherein the policy reporting operation further includes:
  evaluating each setting instance in the settings document;
  identifying each setting instance corresponding setting type;
  using the setting type definition to describe the setting instance;
  generating a report element describing the setting instance.

12. A non-transitory computer readable medium comprising computer executable instructions for execution in a processor for:
  storing policy settings for a group policy infrastructure in a settings document, the settings document having a common document format that defines how to implement policy operations on the policy settings, the policy operations including configuration, application, analysis, reporting and auditing; and
  processing the settings document to implement any of the policy operations within the group policy infrastructure;
further comprising computer executable instructions for execution in the processor for the policy configuration operation for:
  loading a schema document that defines configurable policy settings;
  selecting from the schema document a setting type to configure;
  creating an instance of the selected setting type in the settings document;
  setting a user parameter value to customize the setting instance.

13. The non-transitory computer readable medium of claim 12 further comprising computer executable instructions for execution in the processor for:
  loading plural settings documents, each settings document including policy settings;
  merging the policy settings from the plural settings documents based on a priority to generate a resultant set of policy (RSoP) document;
  applying the merged policy settings from the RSoP document to a client;
  storing the RSoP document as an RSoP logging document.

14. The non-transitory computer readable medium of claim 12 further comprising computer executable instructions for execution in the processor for:
- loading plural settings documents, each settings document including policy settings;
- merging the policy settings from the plural settings documents based on a priority to generate a resultant set of policy (RSoP) document;
- storing the RSoP document as an RSoP planning document;
- generating a report based on the RSoP planning document.

15. The non-transitory computer readable medium of claim 12 further comprising computer executable instructions for execution in the processor for the policy reporting operation for:
- loading the settings document;
- generating a report based on the settings document.

16. A non-transitory computer readable medium comprising computer executable instructions for execution in a processor for:
- storing policy settings for a group policy infrastructure in a settings document, the settings document having a common document format that defines how to implement policy operations on the policy settings, the policy operations including configuration, application, analysis, reporting and auditing; and
- processing the settings document to implement any of the policy operations within the group policy infrastructure;

further comprising computer executable instructions for execution in the processor for the policy application operation for:
- loading plural settings documents, each settings document including policy settings;
- merging the policy settings from the plural settings documents based on a priority to generate a resultant set of policy (RSoP) document;
- applying the merged policy settings from the RSoP document to a client;
- storing the RSoP document as an RSoP logging document;

further comprising computer executable instructions for execution in the processor for merging the policy settings for:
- comparing each setting instance of a current type to setting instances in a prioritized list of settings in reverse priority order;
- removing any setting instances from the list that match a new setting instance;
- adding the new setting instance to the list.

17. The non-transitory computer readable medium of claim 16 further comprising computer executable instructions for execution in the processor for:
- checking whether a rollback document exists;
- if the rollback document exists, applying policy settings from the rollback document to the client; and
- saving the merged policy settings from the RSoP document as the rollback document prior to applying the merged policy settings.

18. A non-transitory computer readable medium comprising computer executable instructions for execution in a processor for:
- storing policy settings for a group policy infrastructure in a settings document, the settings document having a common document format that defines how to implement policy operations on the policy settings, the policy operations including configuration, application, analysis, reporting and auditing; and
- processing the settings document to implement any of the policy operations within the group policy infrastructure;

further comprising computer executable instructions for execution in the processor for the policy auditing operation for:
- selecting a computer on which to report;
- loading an RSoP logging document from the selected computer;
- generating a report based on the RSoP logging document.

19. A non-transitory computer readable medium comprising computer executable instructions for execution in a processor for:
- storing policy settings for a group policy infrastructure in a settings document, the settings document having a common document format that defines how to implement policy operations on the policy settings, the policy operations including configuration, application, analysis, reporting and auditing; and
- processing the settings document to implement any of the policy operations within the group policy infrastructure;

further comprising computer executable instructions for execution in the processor for the policy analysis operation for:
- loading plural settings documents, each settings document including policy settings;
- merging the policy settings from the plural settings documents based on a priority to generate a resultant set of policy (RSoP) document;
- storing the RSoP document as an RSoP planning document;
- generating a report based on the RSoP planning document;
- comparing each setting instance of a current type to setting instances in a prioritized list of settings in reverse priority order;
- removing any setting instances from the list that match a new setting instance;
- adding the new setting instance to the list.

* * * * *